(12) United States Patent
Ito

(10) Patent No.: US 11,199,430 B2
(45) Date of Patent: *Dec. 14, 2021

(54) PHYSICAL QUANTITY MEASUREMENT DEVICE FOR MEASURING A PHYSICAL QUANTITY OF A FLUID

(71) Applicant: DENSO CORPORATION, Kariya (JP)

(72) Inventor: Kengo Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/985,627

(22) Filed: Aug. 5, 2020

(65) Prior Publication Data

US 2020/0363251 A1 Nov. 19, 2020

Related U.S. Application Data

(63) Continuation of application No. PCT/JP2019/003941, filed on Feb. 5, 2019.

(30) Foreign Application Priority Data

Feb. 7, 2018 (JP) .............................. JP2018-020388

(51) Int. Cl.
*G01F 1/69* (2006.01)
*G01F 5/00* (2006.01)

(52) U.S. Cl.
CPC . *G01F 1/69* (2013.01); *G01F 5/00* (2013.01)

(58) Field of Classification Search
CPC . G01F 1/69; G01F 5/00; G01F 1/6842; G01F 1/72
See application file for complete search history.

(56) References Cited

U.S. PATENT DOCUMENTS

| | | | |
|---|---|---|---|
| 2013/0019675 A1* | 1/2013 | Ban | ........................ G01F 1/6842 73/202 |
| 2013/0192354 A1 | 8/2013 | Kaifu et al. | |

(Continued)

FOREIGN PATENT DOCUMENTS

| | | |
|---|---|---|
| JP | 2010-101889 | 5/2010 |
| JP | 2015-021464 | 2/2015 |
| JP | 2015-068794 | 4/2015 |

(Continued)

OTHER PUBLICATIONS

U.S. Appl. No. 16/985,496, to Tagawa et al., "Physical Quanity Measurement Device", filed Aug. 5, 2020 (234 pages).

(Continued)

*Primary Examiner* — David Z Huang

(74) *Attorney, Agent, or Firm* — Nixon & Vanderhye P.C.

(57) ABSTRACT

A physical quantity measurement device includes a passage flow channel having an inflow port and an outflow port, a branch flow channel branched from the passage flow channel and having a branch inlet into which the fluid flows from the passage flow channel. The branch flow channel has an inclined branch path inclined with respect to the passage flow channel, and the inclined branch path extends from the branch inlet toward the outflow por. An inclination angle of the branch flow channel at the branch inlet with respect to a virtual straight line connecting the inflow port and the outflow port is smaller than or equal to a predetermined value.

16 Claims, 17 Drawing Sheets

(56) References Cited

U.S. PATENT DOCUMENTS

| | | | | |
|---|---|---|---|---|
| 2015/0135824 | A1* | 5/2015 | Morino | G01F 1/692 73/204.13 |
| 2020/0363250 | A1* | 11/2020 | Kitahara | G01K 7/16 |

FOREIGN PATENT DOCUMENTS

| | | |
|---|---|---|
| WO | 2019/156041 | 8/2019 |
| WO | 2019/156042 | 8/2019 |
| WO | 2019/156044 | 8/2019 |
| WO | 2019/156045 | 8/2019 |
| WO | 2019/156046 | 8/2019 |
| WO | 2019/156048 | 8/2019 |

OTHER PUBLICATIONS

U.S. Appl. No. 16/985,547, to Kitahara et al., "Physical Quanity Measurement Device", filed Aug. 5, 2020 (233 pages).

U.S. Appl. No. 16/985,322, to Ito et al., "Physical Quanity Measurement Device", filed Aug. 5, 2020 (233 pages).

U.S. Appl. No. 16/985,359, to Ito, "Physical Quanity Measurement Device", filed Aug. 5, 2020 (81 pages).

U.S. Appl. No. 16/985,416, to Akuzawa et al., "Physical Quanity Measurement Device", filed Aug. 5, 2020 (233 pages).

U.S. Appl. No. 16/985,663, to Akuzawa et al., "Physical Quanity Measurement Device", filed Aug. 5, 2020 (233 pages).

U.S. Appl. No. 16/985,496, filed Aug. 5, 2020, Physical Quantity Measurement Device.

U.S. Appl. No. 16/985,547, filed Aug. 5, 2020, Physical Quantity Measurement Device.

U.S. Appl. No. 16/985,322, filed Aug. 5, 2020, Physical Quantity Measurement Device.

U.S. Appl. No. 16/985,359, filed Aug. 5, 2020, Physical Quantity Measurement Device.

U.S. Appl. No. 16/985,416, filed Aug. 5, 2020, Physical Quantity Measurement Device.

U.S. Appl. No. 16/985,663, filed Aug. 5, 2020, Physical Quantity Measurement Device.

U.S. Appl. No. 16/985,627, filed Aug. 5, 2020, Physical Quantity Measurement Device.

* cited by examiner

FIG. 2
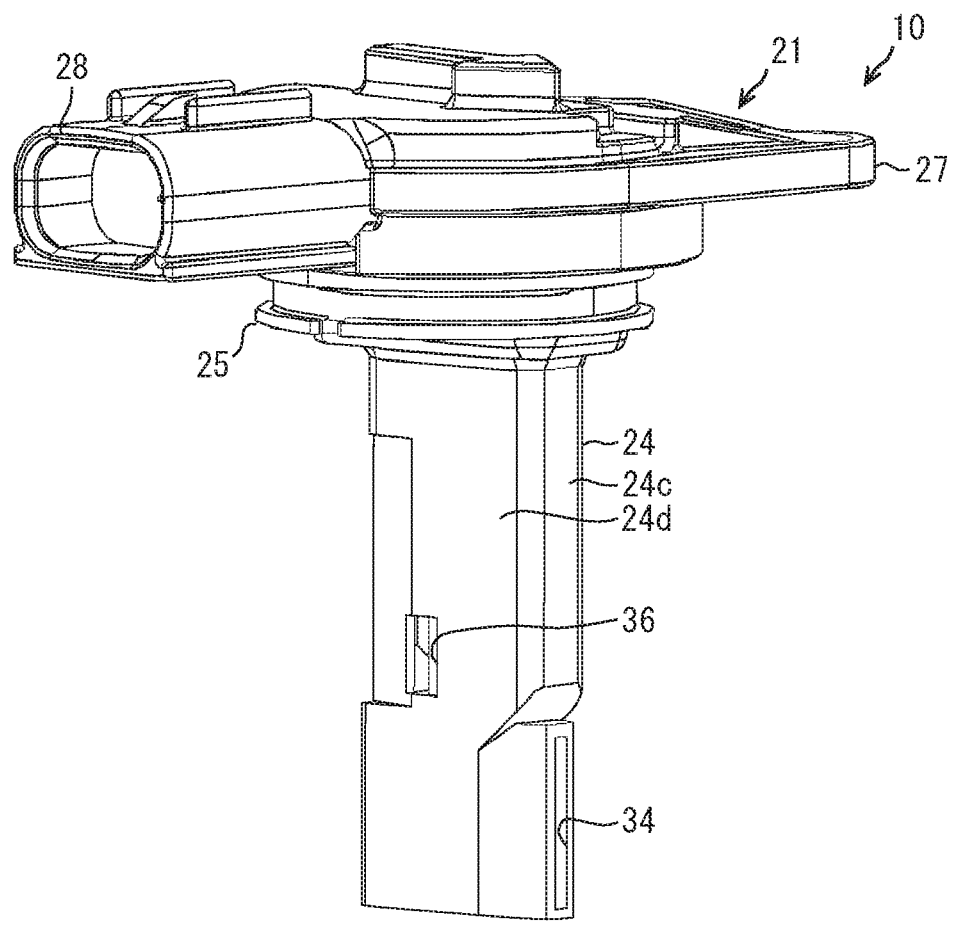
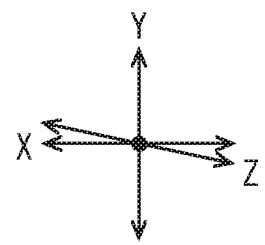

FIG. 15
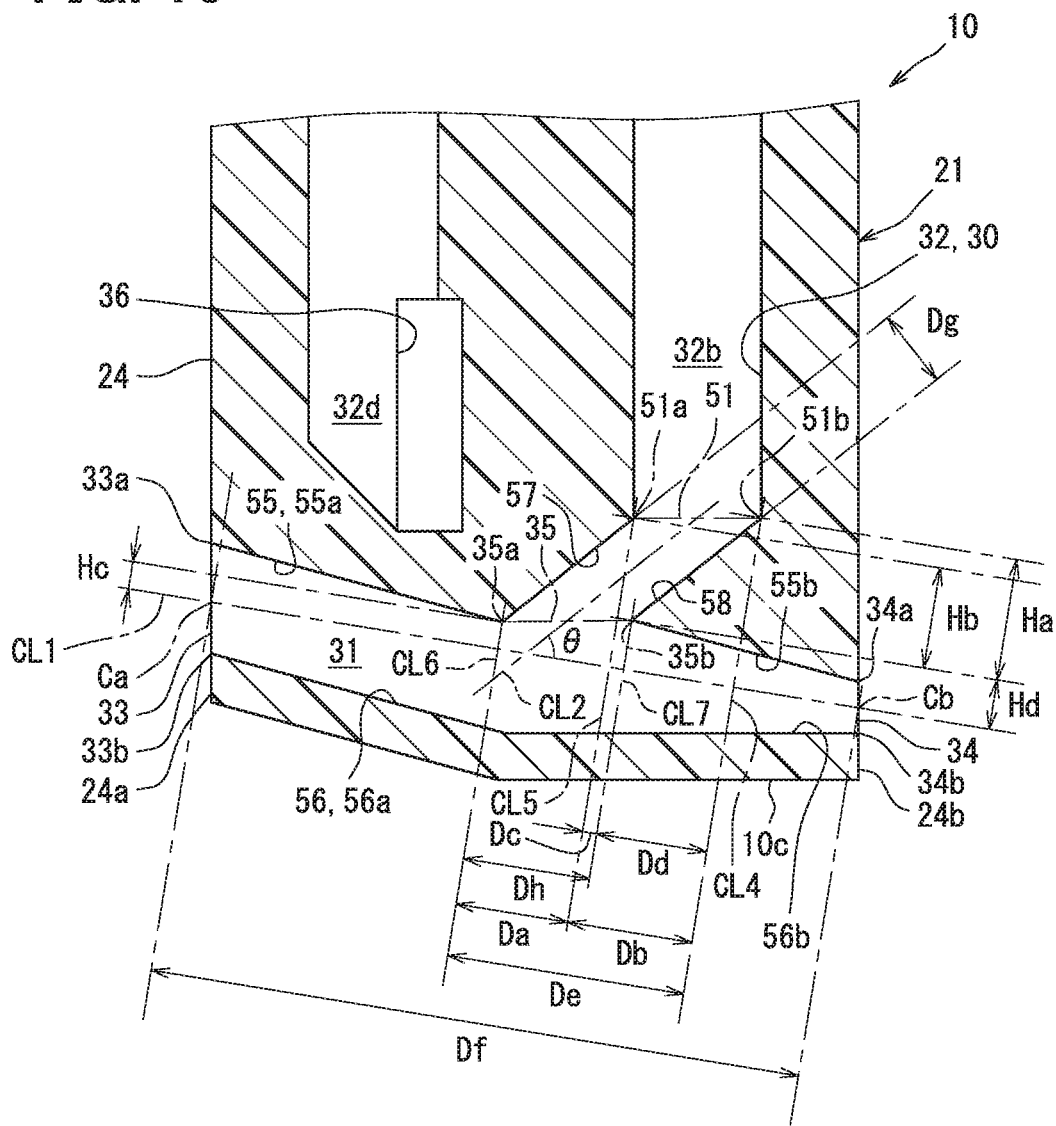
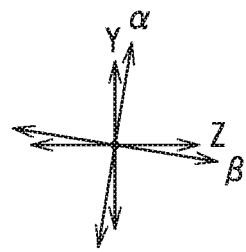

PHYSICAL QUANTITY MEASUREMENT DEVICE FOR MEASURING A PHYSICAL QUANTITY OF A FLUID

CROSS REFERENCE TO RELATED APPLICATIONS

The present application is a continuation application of International Patent Application No. PCT/JP2019/003941 filed on Feb. 5, 2019, which designated the U.S. and claims the benefit of priority from Japanese Patent Application No. 2018-020388 filed on Feb. 7, 2018. The entire disclosures of all of the above applications are incorporated herein by reference.

TECHNICAL FIELD

The disclosure of the present specification relates to a physical quantity measurement device.

BACKGROUND

A physical quantity measurement device for measuring a physical quantity of a fluid includes a bypass flow channel through which an air passes and a sub-bypass flow channel branched from the bypass flow channel. A flow rate sensor for detecting a flow rate of air is provided in the sub-bypass flow channel.

SUMMARY

According to at least one embodiment of the present disclosure, a physical quantity measurement device measures a physical quantity of a fluid. The physical quantity measurement device includes: a passage flow channel through which the fluid passes, the passage flow channel having an inflow port into which the fluid flows and an outflow port from which the fluid flows out, the physical quantity of the fluid being an object to be measured; a branch flow channel branched from the passage flow channel, the branch flow channel having a branch inlet into which the fluid flows from the passage flow channel; and a physical quantity detector that detects the physical quantity of the fluid in the branch flow channel. A passage line is defined as a virtual straight line extending through both a center of the inflow port and a center of the outflow port. The branch flow channel has an inclined branch path inclined with respect to the passage flow channel, the inclined branch path extending from the branch inlet toward the outflow port along a passage direction in which the passage line extends.

BRIEF DESCRIPTION OF DRAWINGS

The details of one or more embodiments are set forth in the accompanying drawings and the description below. Other features and advantages will be apparent from the description and drawings, and from the claims.

FIG. 2 is a perspective view of the air flow meter as viewed from a downstream outer surface side.

FIG. 15 is an enlarged view of a periphery of a measurement inlet in FIG. 14.

DETAILED DESCRIPTION

Figure 1:
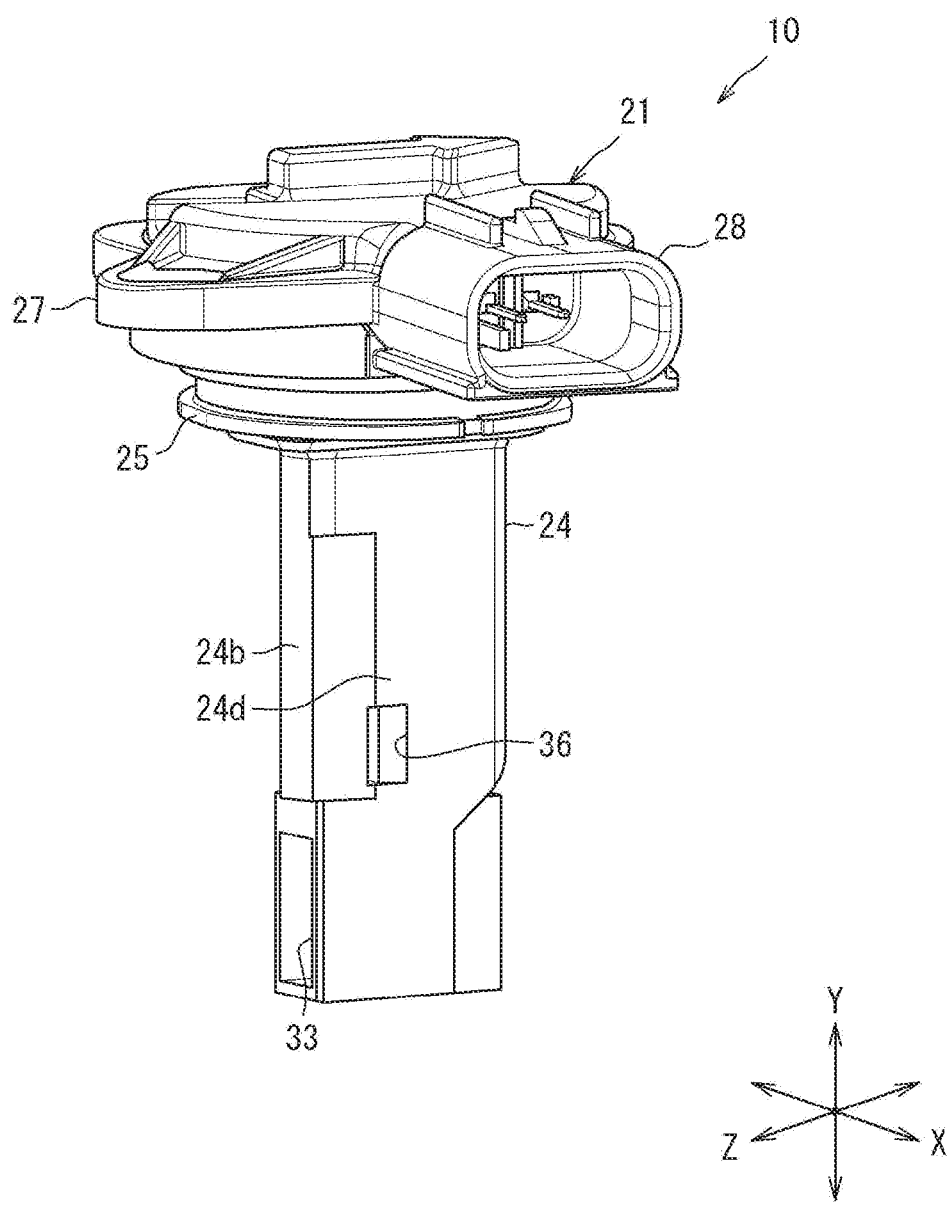
FIG. 1 is a perspective view of an air flow meter as viewed from an upstream outer surface side according to a first embodiment.
Figure 3:
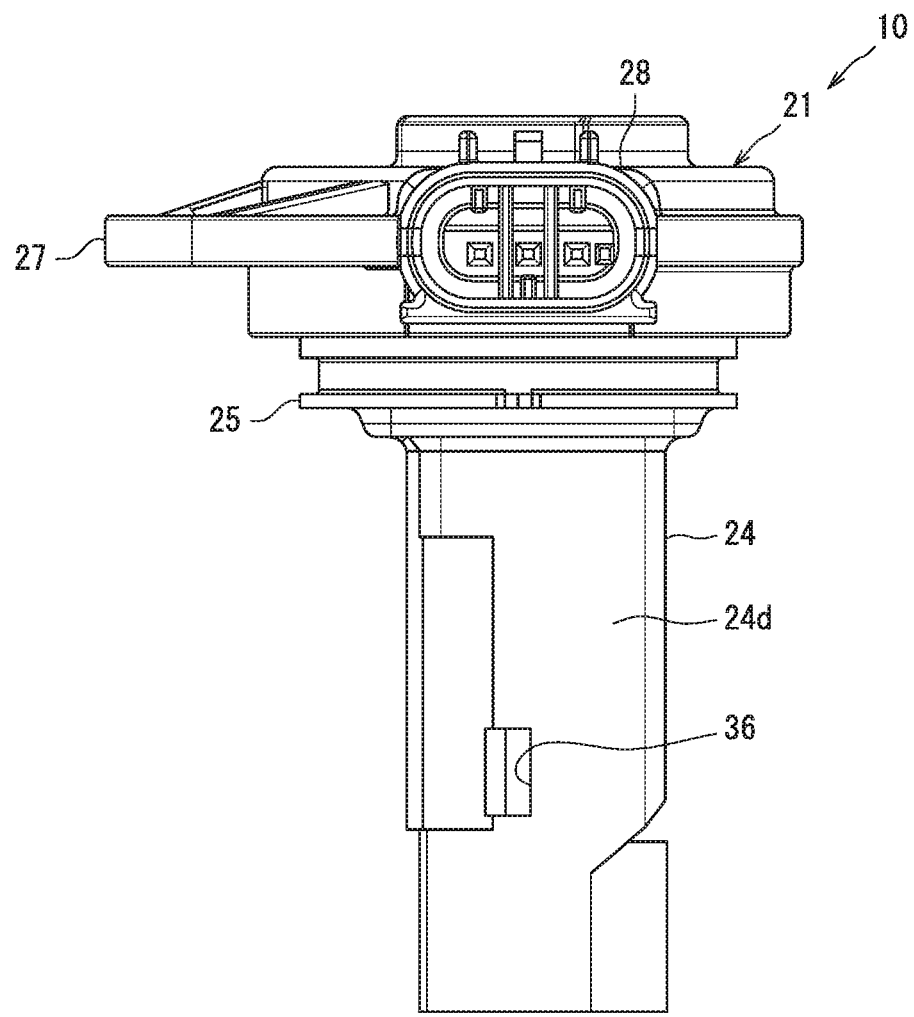
FIG. 3 is a front view of the air flow meter as viewed from an inflow port side.

A comparative example will be described. A physical quantity measurement device for measuring a physical quantity of a fluid, according to the comparative example, includes a bypass flow channel through which an air passes and a sub-bypass flow channel branched from the bypass flow channel. In the above physical quantity measurement device, a flow rate sensor for detecting a flow rate of air is provided in the sub-bypass flow channel, and the air flowing from the bypass flow channel into the sub-bypass flow channel becomes a detection target of the flow rate sensor.

However, in the configuration in which the sub-bypass flow channel branches off from the bypass flow channel, air flowing into the sub-bypass flow channel from the bypass flow channel is expected to include not only a forward flow air flowing into the bypass flow channel from a bypass inlet but also a backward flow air flowing into the sub-bypass flow channel from a bypass outlet. When the backward flow air flows from the bypass outlet, there is a concern that the physical quantity measurement device measures the flow rate as if the forward flow air flowing from the bypass inlet reaches the flow rate sensor even though the backward flow air flowing from the bypass outlet actually reaches the flow rate sensor. In that case, an accuracy in measurement of the flow rate by the physical quantity measurement device may be lowered.

In contrast, a physical quantity measurement device of the present disclosure is capable of improving an accuracy in measurement of a physical quantity.

According to a first aspect of the present disclosure, a physical quantity measurement device measures a physical quantity of a fluid. The physical quantity measurement device includes: a passage flow channel through which the fluid passes, the passage flow channel having an inflow port into which the fluid flows and an outflow port from which the fluid flows out, the physical quantity of the fluid being an object to be measured; a branch flow channel branched from the passage flow channel, the branch flow channel having a branch inlet into which the fluid flows from the passage flow channel; and a physical quantity detector that detects the physical quantity of the fluid in the branch flow channel. A passage line is defined as a virtual straight line extending through both a center of the inflow port and a center of the outflow port. The branch flow channel has an inclined branch path inclined with respect to the passage flow channel, the inclined branch path extending from the branch inlet toward the outflow port along a passage direction in which the passage line extends. A branch coincident line is defined as a virtual straight line which coincides with a center line of the inclined branch path in the branch inlet. An inclination angle of the branch coincident line with respect to the passage line is smaller than or equal to 60 degrees.

According to the first aspect, in the configuration in which the inclined branch path extends from the passage flow channel toward the outflow port, the inclination angle of the branch coincident line with respect to the passage line is 60 degrees or smaller. In the above configuration, since the inclination angle of the branch coincident line with respect to the passage line is 60 degrees or smaller, even if a backward flow air flowing from the outflow port into the passage flow channel occurs, the backward flow air is less likely to flow into the branch flow channel. This fact can reduce the backward flow air from the outflow port reaching the physical quantity detector. In this case, the physical quantity measurement device can be prevented from measuring the physical quantity as if the forward flow air flowing from the inflow port reaches the physical quantity detector even though the backward flow air flowing from the outflow port actually reaches the physical quantity detector. This makes it possible to improve the accuracy in measurement of the physical quantity by the physical quantity measurement device.

According to a second aspect of the present disclosure, a physical quantity measurement device measures a physical quantity of a fluid. The physical quantity measurement device includes: a passage flow channel through which the fluid passes, the passage flow channel having an inflow port into which the fluid flows and an outflow port from which the fluid flows out, the physical quantity of the fluid being an object to be measured; a branch flow channel branched from the passage flow channel, the branch flow channel having a branch inlet into which the fluid flows from the passage flow channel; and a physical quantity detector that detects the physical quantity of the fluid in the branch flow channel. A passage line is defined as a virtual straight line extending through both a center of the inflow port and a center of the outflow port. The branch flow channel has an inclined branch path inclined with respect to the passage flow channel, the inclined branch path extending from the branch inlet toward the outflow port along a passage direction in which the passage line extends. A branch coincident line is defined as a virtual straight line which coincides with a center line of the inclined branch path in the branch inlet. An inner peripheral surface of the inclined branch path includes: an inflow inclined surface extending along the branch coincident line from an inflow side edge of the branch inlet that is nearest to the inflow port in the passage direction in the branch inlet; and an outflow inclined surface extending along the branch coincident line from an outflow side edge of the branch inlet that is nearest to the outflow port in the passage direction in the branch inlet. An inflow orthogonal line is defined as a virtual straight line orthogonal to the passage direction and extending through a portion of the inflow inclined surface that is nearest to the outflow port in the passage direction in the inflow inclined surface. An outflow orthogonal line is defined as a virtual straight line orthogonal to the passage direction and extending through a portion of the outflow inclined surface that is nearest to the outflow port in the passage direction in the outflow inclined surface. An inflow inlet line is defined as a virtual straight line orthogonal to the passage direction and extending through the inflow side edge of the branch inlet. A first orthogonal distance, which is a separation distance in the passage direction between the inflow inlet line and the inflow orthogonal line, is larger than or equal to a second orthogonal distance which is a separation distance in the passage direction between the inflow orthogonal line and the outflow orthogonal line.

According to the second aspect, in the configuration in which the inclined branch path extends from the passage flow channel toward the outflow port, the first orthogonal distance is equal to or greater than the second orthogonal distance. In the above configuration, since the first orthogonal distance is equal to or larger than the second orthogonal distance, the backward flow air is less likely to flow into the branch flow channel even if the backward flow air flowing from the outlet into the passage flow channel occurs. This fact can reduce the backward flow air from the outflow port reaching the physical quantity detector. For that reason, the same effects as those of the first aspect can be obtained.

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

An air flow meter 10 shown in FIGS. 1 to 4 is included in a combustion system having an internal combustion engine, such as a gasoline engine. As shown in FIG. 5, the air flow meter 10 is provided in an intake passage 12 for supplying an intake air to the internal combustion engine in a combustion system, and measures a physical quantity such as a flow rate, a temperature, a humidity, and a pressure of a gas such as the intake air or a fluid such as a gas flowing through the intake passage 12. In that case, the air flow meter 10 corresponds to a physical quantity measurement device.

The air flow meter 10 is attached to an intake pipe 12a such as a duct forming the intake passage 12. The intake pipe 12a is provided with an airflow insertion hole 12b as a through hole penetrating through an outer peripheral portion of the intake pipe 12a. An annular pipe flange 12c is attached to the airflow insertion hole 12b, and the pipe flange 12c is included in the intake pipe 12a. The air flow meter 10 is inserted into the pipe flange 12c and the airflow insertion hole 12b to enter the intake passage 12, and is fixed to the intake pipe 12a and the pipe flange 12c in this state.

In the present embodiment, a width direction X, a height direction Y, and a depth direction Z are defined for the air flow meter 10, and those directions X, Y, and Z are orthogonal to each other. The air flow meter 10 extends in the height direction Y, and the intake passage 12 extends in the depth direction Z. The air flow meter 10 includes an entering part 10a entering the intake passage 12 and a protruding part 10b protruding outside from the pipe flange 12c without entering the intake passage 12, and the entering part 10a and the protruding part 10b are aligned in the height direction Y. In the air flow meter 10, one of a pair of end faces 10c and 10d, which is included in the entering part 10a is referred to as an air flow tip end face 10c, and the other end surface included in the protruding part 10b is referred to as an air flow base end face 10d. In that case, the air flow tip end face 10c and the air flow base end face 10d are aligned in the height direction Y. The air flow tip end face 10c and the air flow base end face 10d are orthogonal to the height direction Y. A tip end surface of the pipe flange 12c is also orthogonal to the height direction Y.

As shown in FIGS. 1 to 4, the air flow meter 10 includes a housing 21, a flow rate detector 22 (see FIG. 5) for detecting a flow rate of the intake air, and an intake air temperature sensor 23 (see FIG. 4) for detecting the temperature of the intake air. The housing 21 is made of, for example, a resin material or the like. In the air flow meter 10, since the housing 21 is attached to the intake pipe 12a, the flow rate detector 22 can come into contact with the intake air flowing through the intake passage 12. The housing 21 includes a housing main body 24, a ring holding portion 25, a flange portion 27, and a connector portion 28, and an O-ring 26 (see FIG. 5) is attached to the ring holding portion 25.

The housing main body 24 is formed in a cylindrical shape as a whole, and in the housing 21, the ring holding portion 25, the flange portion 27, and the connector portion 28 are integrally provided in the housing main body 24. The ring holding portion 25 is included in the entering part 10a, and the flange portion 27 and the connector portion 28 are included in the protruding part 10b.

The ring holding portion 25 is provided inside the pipe flange 12c, and holds the O-ring 26 so as not to be displaced in the height direction Y. The O-ring 26 is a sealing member for sealing the intake passage 12 inside the pipe flange 12c, and is in close contact with both an outer peripheral surface of the ring holding portion 25 and an inner peripheral surface of the pipe flange 12c. A fixing hole such as a screw hole for fixing a fixing tool such as a screw for fixing the air flow meter 10 to the intake pipe 12a is provided in the flange portion 27. The connector portion 28 is a protection portion for protecting a connector terminal electrically connected to the flow rate detector 22.

The flow rate detector 22 is provided in an internal space 24a of the housing main body 24, and the intake air temperature sensor 23 is provided outside the housing 21. The intake air temperature sensor 23 has a temperature sensing element for sensing a temperature of the intake air, a lead wire extending from the temperature sensing element, and an intake air temperature terminal connected to the lead wire. The housing 21 has a support portion for supporting the intake air temperature sensor 23, and the support portion is provided on an outer peripheral side of the housing 21.

As shown in FIG. 5, the housing main body 24 provides a bypass flow channel 30 through which a part of the intake air flowing through the intake passage 12 flows. The bypass flow channel 30 is disposed in the entering part 10a of the air flow meter 10. The bypass flow channel 30 has a passage flow channel 31 and a measurement flow channel 32, and the passage flow channel 31 and the measurement flow channel 32 are defined by the internal space 24a of the housing main body 24. The intake passage 12 may be referred to as a main passage, and the bypass flow channel 30 may be referred to as a sub-passage. In FIG. 5, the O-ring 26 is not shown.

The passage flow channel 31 penetrates through the housing main body 24 in the depth direction Z. The passage flow channel 31 has an inflow port 33 as an upstream end and an outflow port 34 as a downstream end. The measurement flow channel 32 is a branch flow channel branched from an intermediate portion of the passage flow channel 31, and the flow rate detector 22 is provided in the measurement flow channel 32. The measurement flow channel 32 has a measurement inlet 35 which is an upstream end of the measurement flow channel 32 and a measurement outlet 36 which is a downstream end of the measurement flow channel 32. A portion where the measurement flow channel 32 branches from the passage flow channel 31 is a boundary between the passage flow channel 31 and the measurement flow channel 32, and the measurement inlet 35 is included in the boundary. The measurement inlet 35 corresponds to a branch inlet, and the measurement outlet 36 corresponds to a branch outlet. The boundary between the passage flow channel 31 and the measurement flow channel 32 may also be referred to as a flow channel boundary portion.

The flow rate detector 22 includes a circuit board and a detection element mounted on the circuit board, and is a chip-type flow rate sensor. The detection element has a heat generation portion such as a heat generation resistor and a temperature detector, and the flow rate detector 22 outputs a detection signal according to a change in temperature caused by heat generation in the detection element.

The air flow meter 10 has a sensor sub-assembly including the flow rate detector 22, and the sensor sub-assembly is referred to as a sensor SA 40. The sensor SA 40 is accommodated in the housing main body 24. The sensor SA 40 includes an SA main body 41 in addition to the flow rate detector 22. The SA main body 41 has a circuit chip for performing various processes on the detection signal of the flow rate detector 22, a lead frame for supporting the circuit chip, a molded portion made of resin for protecting the circuit chip and the lead frame, and the like, and the flow rate detector 22 is supported by the molded portion and the like. The sensor SA 40 may also be referred to as a detector or a sensor unit.

The sensor SA 40 outputs a detection signal corresponding to the flow rate of the air flowing through the measurement flow channel 32 to the circuit chip, and the circuit chip calculates a flow rate by use of the detection signal of the flow rate detector 22. The calculation result of the circuit chip is the flow rate of the air measured by the air flow meter 10. An inflow port 33 and an outflow port 34 of the air flow meter 10 are disposed at the center position of the intake passage 12 in the height direction Y. The intake air flowing at the center position of the intake passage 12 in the height direction Y flows along the depth direction Z. In this example, because the depth direction Z and the passage direction α coincide with each other, a direction in which the intake air flows in the intake passage 12 substantially coincides with a direction in which the intake air flows in the passage flow channel 31.

In this example, in order to properly maintain a detection accuracy of the flow rate detector 22, there is a need to make the temperature change in the temperature detector caused by the intake flow rate in the detection element large to some extent, and in order to make the temperature change large, it is preferable to make a flow velocity of the fluid, which is in contact with the detection element, large to some extent. This is to reduce the influence of the temperature change acting on the detection element by a natural convection on the temperature change of the detection element according to the flow velocity of the fluid. In this manner, since the influence of the natural convection is reduced by appropriately increasing the flow velocity of the fluid that is in contact with the detection element, the detection accuracy of the flow rate can be enhanced.

The flow rate detector 22 corresponds to a physical quantity detector that detects the flow rate of the intake air as a physical quantity of fluid. The flow rate detector 22 is not limited to a thermal type flow rate sensor, and may be an ultrasonic type flow rate sensor, a Kalman vortex type flow rate sensor, or the like.

Figure 6:
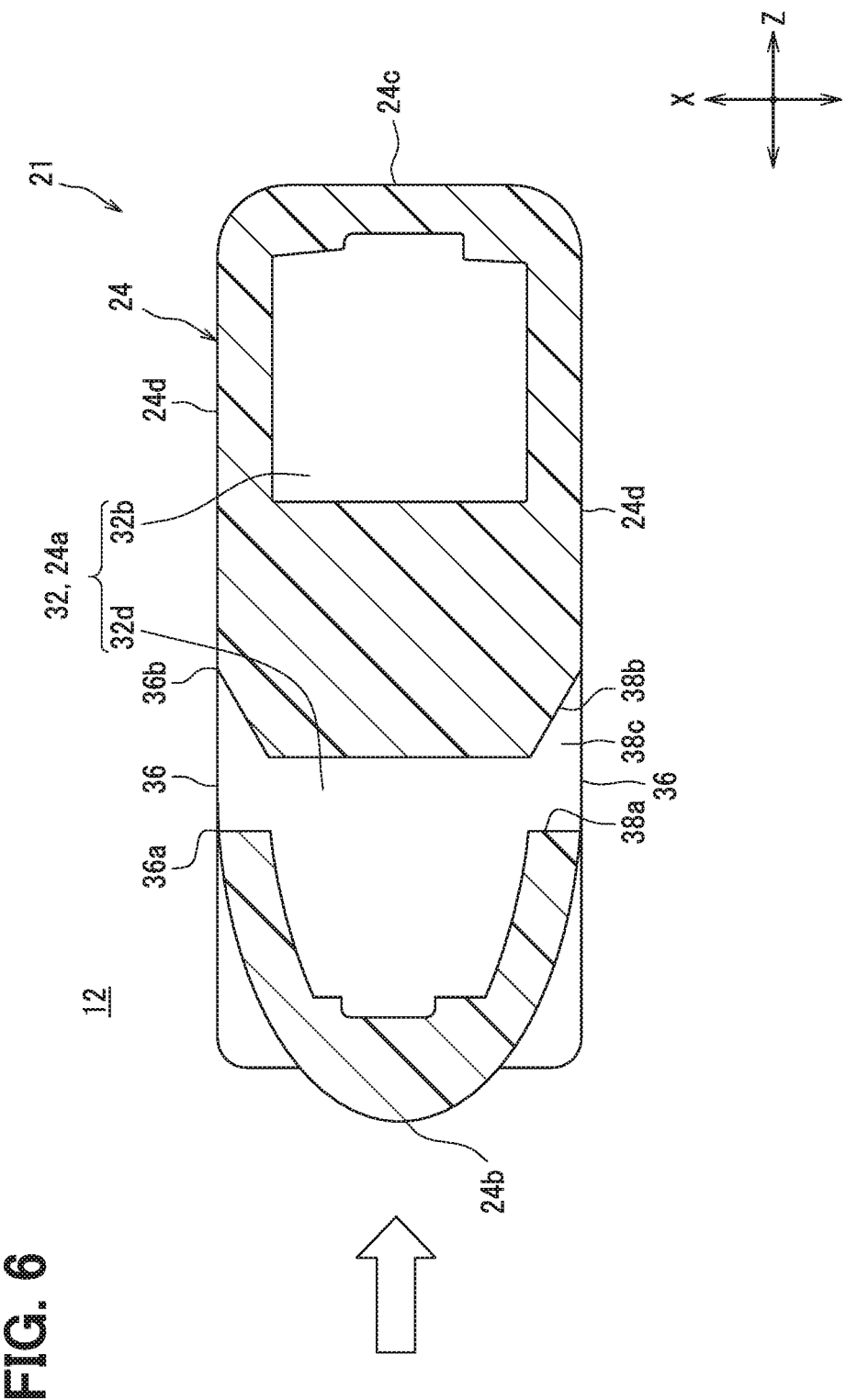
FIG. 6 is a cross-sectional view taken along a line VI-VI of FIG. 5.

As shown in FIG. 6, an outer peripheral surface of the housing main body 24 has an upstream outer surface 24b, a downstream outer surface 24c, and a pair of intermediate outer surfaces 24d. In the outer peripheral surface of the housing main body 24, the upstream outer surface 24b faces the upstream side of the intake passage 12, and the downstream outer surface 24c faces the downstream side of the intake passage 12. The pair of intermediate outer surfaces 24d face opposite sides in the width direction X, and are provided between the upstream outer surface 24b and the downstream outer surface 24c in the depth direction Z. The upstream outer surface 24b is an inclined surface inclined with respect to the depth direction Z. Specifically, the upstream outer surface 24b is an inclined surface curved so that a width dimension of the housing main body 24 in the width direction X is gradually reduced toward the upstream side in the intake passage 12.

As shown in FIG. 5, the upstream outer surface 24b is provided with an inflow port 33, and the downstream outer surface 24c is provided with an outflow port 34. As shown in FIG. 6, the pair of intermediate outer surfaces 24d are provided with respective measurement outlets 36, and those measurement outlets 36 are aligned in the width direction X. The measurement outlets 36 may be provided at positions across a boundary between the upstream outer surface 24b and the intermediate outer surfaces 24d in the depth direction Z.

An inner peripheral surface of the measurement flow channel 32 has forming surfaces 38a to 38c that define the measurement outlets 36. The outer peripheral portion of the housing main body 24 is provided with through holes defining the measurement outlets 36, and the forming surfaces 38a to 38c are included in inner peripheral surfaces of the through holes. The upstream forming surface 38a of the forming surfaces 38a to 38c forms upstream ends 36a of the measurement outlets 36, and the downstream forming surface 38b forms downstream ends 36b of the measurement outlets 36. The connection forming surface 38c connects the upstream forming surfaces 38a and the downstream forming surfaces 38b, and a pair of the connection forming surfaces 38c are provided over the forming surfaces 38a and 38b.

The upstream forming surface 38a is orthogonal to the depth direction Z, and extends in the width direction X from the upstream ends 36a of the measurement outlets 36 toward the inside of the housing main body 24. The downstream forming surface 38b is inclined with respect to the depth direction Z, and is an inclined surface extending straight toward the upstream outer surface 24b from the downstream ends 36b of the measurement outlets 36 toward the inside of the housing main body 24.

A flow of the intake air generated on the outer peripheral side of the housing main body 24 in the intake passage 12 will be briefly described. In the air flowing toward the downstream side of the intake passage 12, an air reaching the upstream outer surface 24b of the housing main body 24 gradually changes a direction of the air while reaching the measurement outlets 36 by advancing along the upstream outer surface 24b which is an inclined surface. As described above, since the direction of the air is smoothly changed by the upstream outer surface 24b, separation of the air is less likely to be generated in the vicinity of the measurement outlets 36. For that reason, the air flowing through the measurement flow channel 32 is likely to flow out of the measurement outlets 36, and the flow velocity in the measurement flow channel 32 easily stabilizes.

Further, the air flowing through the measurement flow channel 32 and flowing out from the measurement outlets 36 to the intake passage 12 flows along the downstream forming surface 38b, which is an inclined surface, so that the air is likely to flow toward the downstream side in the intake passage 12. In this case, when the air flowing out from the measurement outlets 36 along the downstream forming surface 38b joins the intake air flowing through the intake passage 12, a turbulence of the air flow such as a vortex flow is less likely to occur, so that the flow velocity in the measurement flow channel 32 is more likely to be stabilized.

As shown in FIG. 5, the measurement flow channel 32 has a folded shape folded back between the measurement inlet 35 and the measurement outlets 36. The measurement flow channel 32 has a branch path 32a branched from the passage flow channel 31, a guide path 32b for guiding the air flowing in from the branch path 32a toward the flow rate detector 22, a detection path 32c provided with the flow rate detector 22, and a discharge path 32d for discharging the air from the measurement outlets 36. In the measurement flow channel 32, the branch path 32a, the guide path 32b, the detection path 32c, and the discharge path 32d are disposed in the stated order from the upstream side.

The detection path 32c extends in the depth direction Z so as to be parallel to the passage flow channel 31, and is provided at a position separated from the passage flow channel 31 toward the protruding part 10b side. The branch path 32a, the guide path 32b, and the discharge path 32d are provided between the detection path 32c and the passage flow channel 31. The guide path 32b and the discharge path 32d are parallel to each other by extending in the height direction Y from the detection path 32c toward the passage flow channel 31. The branch path 32a is provided between the guide path 32b and the passage flow channel 31, and corresponds to an inclined branch path inclined with respect to the passage flow channel 31. The branch path 32a extends from the measurement inlet 35 toward the outflow port 34 with respect to the depth direction Z, and is a straight flow channel. The discharge path 32d is provided closer to the outflow port 34 than the guide path 32b in the passage direction α, and extends from the measurement outlets 36 toward the detection path 32c.

In the intake passage 12, when pulsations occur in a flow of the intake air due to an operation state of the engine or the like, in addition to a forward flow flowing from the upstream side, a backward flow flowing from the downstream side in the opposite direction to the forward flow may occur in association with the pulsations. There is a concern that the forward flow flows into the passage flow channel 31 from the inflow port 33, while the backward flow flows into the passage flow channel 31 from the outflow port 34. For example, when the forward flow flows in from the inflow port 33 and further flows into the measurement flow channel 32 from the passage flow channel 31, the flow rate of the forward flow is detected by the flow rate detector 22. On the other hand, when the backward flow generated in the intake passage 12 flows in from the outflow port 34 and further flows into the measurement flow channel 32 from the passage flow channel 31, the flow rate of the backward flow is detected by the flow rate detector 22.

In addition to the flow rate of the air in the measurement flow channel 32, the flow rate detector 22 can detect the flow of the air in the measurement flow channel 32. However, if the backward flow flowing from the outflow port 34 flows into the measurement flow channel 32, the backward flow flows through the measurement flow channel 32 from the measurement inlet 35 toward the measurement outlets 36, as with the forward flow flowing from the inflow port 33. As described above, in the measurement flow channel 32, the direction in which the backward flow flowing in from the outflow port 34 flows and the direction in which the forward flow flowing in from the inflow port 33 flows are identical with each other, and therefore, the flow rate detector 22 cannot detect the forward flow and the backward flow in distinction from each other. For that reason, the air flow meter 10 measures the flow rate of the air, on the assumption that all of the air flowing through the measurement flow channel 32 is the forward flow, even though the air flowing through the measurement flow channel 32 actually includes the backward flow. As a result, there is a concern that the measurement accuracy of the air flow meter 10 may be lowered.

Further, in the intake passage 12, the turbulence of the air flow such as a vortex flow or stagnation may occur as the air passes around the air flow meter 10. For example, when the air flowing through the intake passage 12 as a forward flow passes through the intermediate outer surfaces 24d of the housing main body 24, the turbulence of the air flow occurs due to the mixed flow of the air flowing directly to the downstream side and the air flowing along the downstream outer surface 24c. When the turbulence of the air flow exists in the periphery of the outflow port 34, such as the downstream side of the downstream outer surface 24c, if the backward flow occurs in the intake passage 12, the backward flow becomes an unstable state including the turbulence of the air flow, and there is a concern that the unstable backward flow enters the passage flow channel 31 from the outflow port 34.

Therefore, in the air flow meter 10, even if the backward flow flows into the passage flow channel 31 from the outflow port 34, the branch path 32a branches from the passage flow channel 31 toward the outflow port 34, so that the backward flow is less likely to flow into the branch path 32a from the passage flow channel 31. In particular, in the air flow meter 10, a branch angle θ of the branch path 32a with respect to the passage flow channel 31 is set to a value of 60 degrees or less. In other words, a relationship of θ≤60 degrees is established. In the present embodiment, the branch angle θ is set to, for example, 40 degrees. This makes it further difficult for the backward flow to flow from the passage flow channel 31 into the branch path 32a.

In the bypass flow channel 30, a virtual passage line CL1 is set for the passage flow channel 31, a virtual branch coincident line CL2 is set for the branch path 32a, and the branch angle θ is an inclination angle of the branch coincident line CL2 with respect to the passage line CL1.

First, the passage line CL1 will be described. In the housing main body 24, since the passage flow channel 31 extends straight in the depth direction Z, the inflow port 33 and the outflow port 34 are aligned in the depth direction Z. In that instance, if a virtual straight line passing through both a center Ca of the inflow port 33 and a center Cb of the outflow port 34 is referred to as the passage line CL1, the passage line CL1 coincides with a center line of the passage flow channel 31. In other words, the centers Ca and Cb have the same position in both the width direction X and the height direction Y, and are aligned in the depth direction Z. For that reason, when the direction in which the passage line CL1 extends is referred to as a passage direction α, the passage direction α coincides with the depth direction Z. A direction orthogonal to the passage direction α is referred to as an orthogonal direction β.

In the passage flow channel 31, a cross-sectional area in the orthogonal direction β is referred to as a flow channel area, and the flow channel area is uniform in the passage direction α. In this example, the inflow port 33 and the outflow port 34 are orthogonal to the passage line CL1. For that reason, an open area of the inflow port 33 and an open area of the outflow port 34 are the same as a flow channel area of the passage flow channel 31. A cross-sectional shape of the passage flow channel 31 in the orthogonal direction β is substantially rectangular.

Next, the branch coincident line CL2 will be described. In the measurement flow channel 32, the branch path 32a extends straight, so that the center line of the branch path 32a becomes a straight line. For that reason, assuming the virtual branch coincident line CL2 coinciding with the center line of the branch path 32a, the branch coincident line CL2 is a straight line. The branch path 32a has a measurement inlet 35, which is an upstream end of the branch path 32a, and a branch downstream port 51, which is a downstream end of the branch path 32a, and the branch downstream port 51 is included in a boundary between the branch path 32a and the guide path 32b. The branch coincident line CL2 passes through a center of the measurement inlet 35 and a center of the branch downstream port 51.

In the measurement flow channel 32, a cross-sectional area in a direction orthogonal to the branch coincident line CL2 is referred to as a flow channel area, and the flow channel area is uniform in the direction in which the branch coincident line CL2 extends. In this example, the measurement inlet 35 and the branch downstream port 51 are not orthogonal to the branch coincident line CL2. For that reason, the open area of the measurement inlet 35 and the open area of the branch downstream port 51 are larger than a flow channel area of the measurement flow channel 32. Those open areas become larger as the inclination angles of the measurement inlet 35 and the branch downstream port 51 with respect to the branch coincident line CL2 become larger.

In the measurement flow channel 32, when the cross-sectional area of each of the guide path 32b, the detection path 32c, and the discharge path 32d in the direction orthogonal to the center line is referred to as a flow channel area, each flow channel area is uniform in the direction in which each center line extends. The flow channel areas of the guide path 32b, the detection path 32c, and the discharge path 32d are the same as the flow channel area of the branch path 32a. Further, in the measurement flow channel 32, the cross-sectional shape in the direction orthogonal to the center line of the measurement flow channel 32 is substantially rectangular.

In the air flow meter 10 according to the present embodiment, in addition to the fact that the branch angle θ is smaller than 60 degrees, a configuration is realized in which the backward flow is inhibited from flowing from the passage flow channel 31 into the branch path 32a.

Figure 7:
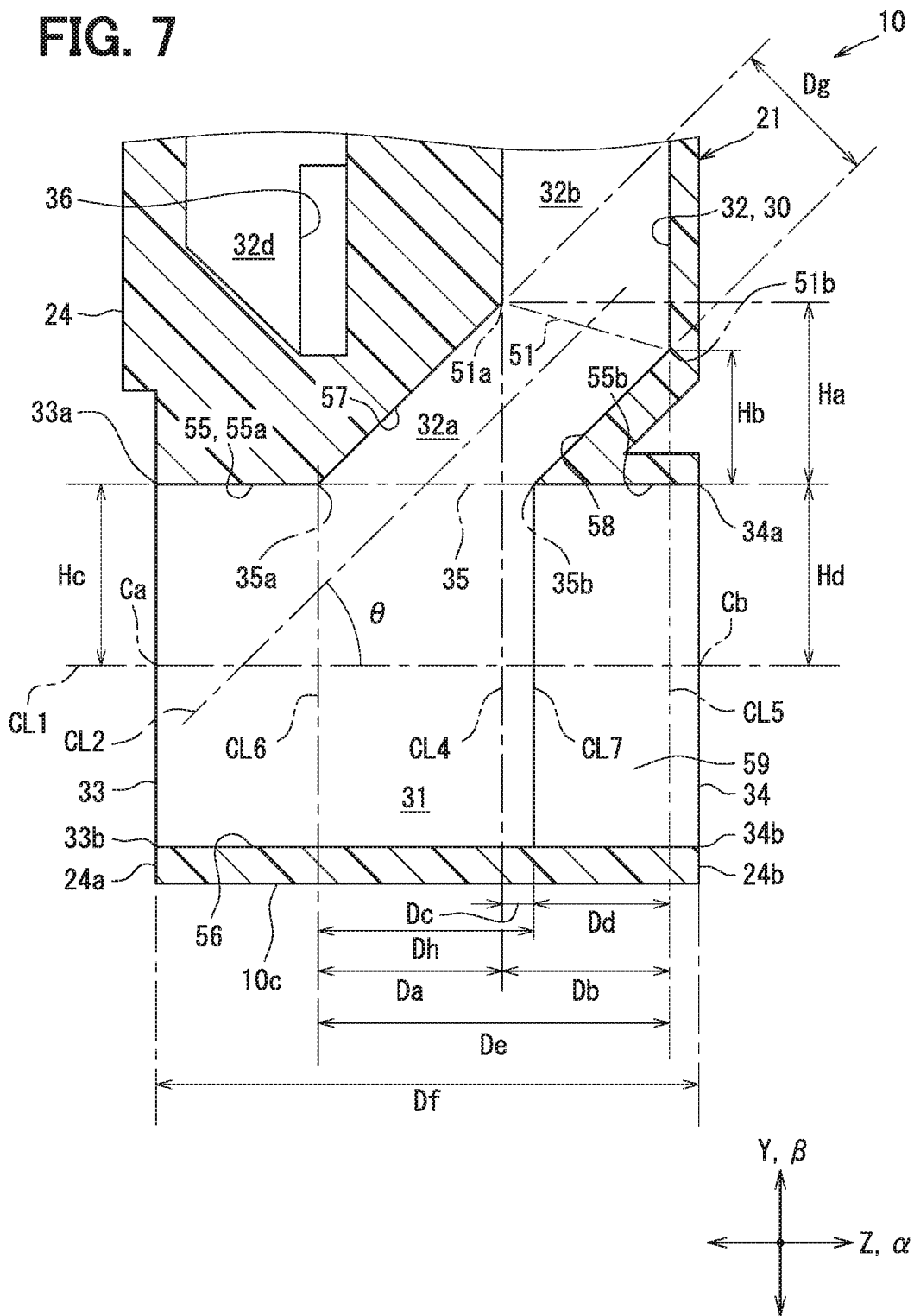
FIG. 7 is an enlarged view of a periphery of a measurement inlet in FIG. 5.

As shown in FIG. 7, an inner peripheral surface of the passage flow channel 31 has a passage ceiling surface 55 and a passage floor surface 56. The passage ceiling surface 55 extends over an end 33a of the inflow port 33 on the side of the air flow base end face 10*d* and an end 34*a* of the outflow port 34 on the side of the air flow base end face 10*d*, and extends along the passage line CL1. The passage floor surface 56 extends over an end 33*b* of the inflow port 33 on the side of the air flow tip end face 10*c* and an end 34*b* of the outflow port 34 on the side of the air flow base end face 10*d*, and extends along the passage line CL1. The passage ceiling surface 55 and the passage floor surface 56 are opposed to each other across the passage line CL1, and extend in the passage direction α in parallel with each other.

The passage ceiling surface 55 is provided with the measurement inlet 35, and the passage ceiling surface 55 has an inflow ceiling surface 55*a* provided between the measurement inlet 35 and the inflow port 33, and an outflow ceiling surface 55*b* provided between the measurement inlet 35 and the outflow port 34. In this example, the measurement inlet 35 has an inflow side edge 35*a* which is an end on the inflow port 33 side in the passage direction α, and an outflow side edge 35*b* which is an end on the outflow port 34 side in the passage direction α. The inflow ceiling surface 55*a* extends over the inflow side edge 35*a* of the measurement inlet 35 and the inflow port 33, and the outflow ceiling surface 55*b* extends over the outflow side edge 35*b* of the measurement inlet 35 and the outflow port 34.

An inner peripheral surface of the branch path 32*a* has an inflow branch surface 57 and an outflow branch surface 58. The inflow branch surface 57 extends from the inflow ceiling surface 55*a* toward the guide path 32*b*, and the outflow branch surface 58 extends from the outflow ceiling surface 55*b* toward the guide path 32*b*. In this example, the branch downstream port 51 of the branch path 32*a* has an inflow side edge 51*a* which is an end on the inflow port 33 side in the passage direction α, and an outflow side edge 51*b* which is an end on the outflow port 34 side in the passage direction α. The inflow branch surface 57 extends over the inflow side edge 35*a* of the measurement inlet 35 and the inflow side edge 51*a* of the branch downstream port 51, and the outflow branch surface 58 extends over the outflow side edge 35*b* of the measurement inlet 35 and the outflow side edge 51*b* of the branch downstream port 51. The inflow branch surface 57 and the outflow branch surface 58 are opposed to each other across the branch coincident line CL2, and extend in parallel with each other along the branch coincident line CL2.

In the inflow branch surface 57, a portion closest to the inflow port 33 in the passage direction α is the inflow side edge 35*a* of the measurement inlet 35, and a portion closest to the outflow port 34 in the passage direction α is the inflow side edge 51*a* of the branch downstream port 51. In the outflow branch surface 58, a portion closest to the inflow port 33 in the passage direction α is the outflow side edge 35*b* of the measurement inlet 35, and a portion closest to the outflow port 34 in the passage direction α is the outflow side edge 51*b* of the branch downstream port 51.

The inflow branch surface 57 corresponds to an inflow inclined surface, and the outflow branch surface 58 corresponds to an outflow inclined surface. The inner peripheral surface of the bypass flow channel 30 such as the passage flow channel 31 and the measurement flow channel 32 is a forming surface defining the bypass flow channel 30 of the inner peripheral surface of the housing 21.

As described above, the passage ceiling surface 55 and the passage floor surface 56 extend in parallel along the passage line CL1, and the inflow branch surface 57 and the outflow branch surface 58 extend in parallel along the branch coincident line CL2. For that reason, an inclination angle of the outflow branch surface 58 with respect to the outflow ceiling surface 55*b* and an inclination angle of the inflow branch surface 57 with respect to the measurement inlet 35 are both the same as the branch angle θ. In that case, since there is a need to swirl rapidly at an angle of 60 degrees or less in order for the backward flow flowing in from the outflow port 34 to flow into the branch path 32*a* from the passage flow channel 31, the backward flow is less likely to flow into the branch path 32*a* from the passage flow channel 31. On the other hand, in order for the forward flow flowing in from the inflow port 33 to flow into the branch path 32*a* from the passage flow channel 31, the direction of the flow may be gradually changed at an angle larger than 120 degrees, so that the forward flow is more likely to flow into the branch path 32*a* from the passage flow channel 31.

In the present embodiment, an inflow orthogonal line CL4, an outflow orthogonal line CL5, an inflow inlet line CL6, and an outflow inlet line CL7 are assumed as virtual straight lines orthogonal to the passage line CL1, and all those lines CL4 to CL7 extend in the orthogonal direction β. Since the inflow orthogonal line CL4 passes through the inflow side edge 51*a* of the branch downstream port 51, the inflow orthogonal line CL4 passes through a portion of the inflow branch surface 57 closest to the outflow port 34 in the passage direction α. Since the outflow orthogonal line CL5 passes through the outflow side edge 51*b* of the branch downstream port 51, the outflow orthogonal line CL5 passes through a portion of the outflow branch surface 58 closest to the outflow port 34 in the passage direction α. The inflow inlet line CL6 passes through the inflow side edge 35*a* of the measurement inlet 35, and thus passes through a portion of the inflow branch surface 57 closest to the inflow port 33 in the passage direction α. The outflow inlet line CL7 passes through the outflow side edge 35*b* of the measurement inlet 35, and thus passes through a portion of the outflow branch surface 58 closest to the inflow port 33 in the passage direction α.

In the passage direction α, when a separation distance between the inflow orthogonal line CL4 and the inflow inlet line CL6 is referred to as a first orthogonal distance Da and a separation distance between the inflow orthogonal line CL4 and the outflow orthogonal line CL5 is referred to as a second orthogonal distance Db, a relationship of Da≥Db is established. In other words, the first orthogonal distance Da is equal to or larger than the second orthogonal distance Db. In this example, the first orthogonal distance Da indicates a length dimension of the inflow branch surface 57 in the passage direction α, and the second orthogonal distance Db indicates a width dimension of the branch path 32*a* in the passage direction α. When the relationship of Da≥Db is satisfied, the inflow branch surface 57 is sufficiently long in the direction in which the branch coincident line CL2 extends with respect to the width dimension of the branch path 32*a* in the passage direction α.

In that case, the backward flow flowing through the passage flow channel 31 cannot swirl suddenly toward the downstream side of the branch path 32*a* in the vicinity of the measurement inlet 35, and tends to move toward the inflow branch surface 57. In this manner, the backward flow flowing toward the inflow branch surface 57 tends to be pushed back toward the passage flow channel 31 side by the inflow branch surface 57 in the vicinity of the measurement inlet 35. Therefore, the inflow branch surface 57 inhibits the backward flow flowing from the outflow port 34 from flowing into the branch path 32*a*.

Further, in the passage direction α, when a separation distance between the inflow orthogonal line CL4 and the outflow inlet line CL7 is referred to as a first inlet distance Dc, and a separation distance between the outflow orthogonal line CL5 and the outflow inlet line CL7 is referred to as a second inlet distance Dd, a relationship of Dc≤Dd is established. In other words, the first inlet distance Dc is equal to or smaller than the second inlet distance Dd. In this example, in the orthogonal direction β, an outflow ceiling surface 55b is provided on the side of the air flow tip end face 10c of the branch downstream port 51. For that reason, to satisfy the relationship of Dc≤Dd means that ½ or more of the branch downstream port 51 on the side of the outflow side edge 51b is covered from the side of the passage flow channel 31 by the outflow ceiling surface 55b and the outflow branch surface 58. In this case, in order for the backward flow flowing into the passage flow channel 31 from the outflow port 34 to flow into the branch path 32a, there is a need to go around the outflow ceiling surface 55b from the side of the measurement inlet 35, so that the backward flow is less likely to flow into the branch path 32a from the passage flow channel 31.

Further, in the passage direction α, the outflow inlet line CL7 is disposed between the inflow orthogonal line CL4 and the outflow orthogonal line CL5. For that reason, in the passage direction α, the outflow ceiling surface 55b is disposed closer to the outflow port 34 than the inflow branch surface 57, and a portion of the branch downstream port 51 smaller than ½ of the inflow side edge 51a side is not covered from the passage flow channel 31 side by the outflow ceiling surface 55b. In that case, the backward flow flowing in from the outflow port 34 is less likely to flow into the branch path 32a from the passage flow channel 31, while the forward flow flowing in from the inflow port 33 into the passage flow channel 31 flows along the inflow branch surface 57, thereby being likely to flow into the branch path 32a.

In addition, in the passage direction α, when a separation distance between the outflow orthogonal line CL5 and the inflow inlet line CL6 is referred to as a branch inlet-outlet distance De and a separation distance between the inflow port 33 and the outflow port 34 is referred to as a passage distance Df, a relationship of De<Df is established. In other words, the branch inlet-outlet distance De is smaller than the passage distance Df. The branch inlet-outlet distance De indicates a sum of the first orthogonal distance Da and the second orthogonal distance Db. For that reason, in addition to the relationship of Da≥Db, a relationship of Da+Db<Df is established. The passage distance Df is a separation distance between the center Ca of the inflow port 33 and the center Cb of the outflow port 34, and indicates a length dimension of the passage flow channel 31 in the passage direction α.

In a direction orthogonal to the direction in which the branch coincident line CL2 extends, if the separation distance between the inflow branch surface 57 and the outflow branch surface 58 is referred to as a branch surface distance Dg, the branch surface distance Dg is the same as the second orthogonal distance Db. The branch surface distance Dg indicates a width dimension of the branch path 32a in a direction orthogonal to the direction in which the branch coincident line CL2 extends. For that reason, the width dimension of the branch path 32a and the width dimension of the guide path 32b are identical with each other.

When the lines CL4 to CL7 are not used, the distances Da to De can be expressed as follows with respect to the passage directions a. The first orthogonal distance Da is a separation distance between the inflow side edge 35a of the measurement inlet 35 and the inflow side edge 51a of the branch downstream port 51. The second orthogonal distance Db is a separation distance between the inflow side edge 51a and the outflow side edge 51b of the branch downstream port 51. The first inlet distance Dc is a separation distance between the inflow side edge 51a of the branch downstream port 51 and the outflow side edge 35b of the measurement inlet 35. The second inlet distance Dd is a separation distance between the outflow side edge 35b of the measurement inlet 35 and the outflow side edge 51b of the branch downstream port 51. The branch inlet-outlet distance De is a separation distance between the inflow side edge 35a of the measurement inlet 35 and the outflow side edge 51b of the branch downstream port 51.

In the orthogonal direction β, a separation distance between the inflow side edge 35a of the measurement inlet 35 and the inflow side edge 51a of the branch downstream port 51 is referred to as an inflow branch distance Ha, and a separation distance between the outflow side edge 35b of the measurement inlet 35 and the outflow side edge 51b of the branch downstream port 51 is referred to as an outflow branch distance Hb. The inflow branch distance Ha indicates a length dimension of the inflow branch surface 57 in the orthogonal direction β, and the outflow branch distance Hb indicates a length dimension of the outflow branch surface 58 in the orthogonal direction β. Due to the fact that the inflow branch surface 57 and the outflow branch surface 58 are parallel to each other, the inflow branch distance Ha is larger than the outflow branch distance Hb. The inflow branch distance Ha corresponds to an inflow inclination distance, and the outflow branch distance Hb corresponds to an outflow inclination distance.

$$\theta > \tan^{-1}\{Ha/(Df-Db)\} \tag{Ex. 1}$$

A minimum value of the branch angle θ is set based on the passage distance Df. In the present embodiment, the minimum value of the branch angle θ is set on the basis of the second orthogonal distance Db, the passage distance Df, and the inflow branch distance Ha because the inflow branch surface 57 extends parallel to the branch coincident line CL2. For example, the branch angle θ is set so that the branch inlet-outlet distance De becomes smaller than the passage distance Df by use of the above (Expression 1).

$$\theta > \tan^{-1}\{Ha/(Df-Db)\} \tag{Ex. 2}$$

Further, in the present embodiment, the minimum value of the branch angle θ is set on the basis of the passage distance Df, the inlet distance Dh, and the outflow branch distance Hb because the outflow branch surface 58 extends parallel to the branch coincident line CL2. The inlet distance Dh is a separation distance between the inflow side edge 35a and the outflow side edge 35b of the measurement inlet 35 in the passage direction α, and indicates a length dimension of the measurement inlet 35 in the passage direction α. For example, the branch angle θ is set so that the branch inlet-outlet distance De becomes smaller than the passage distance Df by use of the above (Expression 2).

A relationship of Hb≤De is established for the branch inlet-outlet distance De and the outflow branch distance Hb. In other words, the outflow branch distance Hb is equal to or smaller than the branch inlet-outlet distance De. The relationship of Hb≤De corresponds to a configuration in which the outflow branch distance Hb is not excessively large than the second inlet distance Dd. For that reason, in the configuration corresponding to at least one of the relationship of θ≤60 degrees and the relationship of Hb≤De, the inclination angle of the outflow branch surface 58 with respect to the outflow ceiling surface 55b is not excessively large.

In the orthogonal direction β, a separation distance between the inflow side edge 35a of the measurement inlet 35 and the passage line CL1 is referred to as an inflow inlet distance Hc, and a separation distance between the outflow side edge 35b of the measurement inlet 35 and the passage line CL1 is referred to as an outflow inlet distance Hd. In the present embodiment, the inflow inlet distance Hc and the outflow inlet distance Hd are identical with each other because the inflow side edge 35a and the outflow side edge 35b of the measurement inlet 35 are aligned in parallel with each other in the passage line CL1. The measurement inlet 35 faces the passage floor surface 56 in the orthogonal direction β, and does not face the inflow port 33 and the outflow port 34. In that case, even if a person looks into the inside of the passage flow channel 31 from the inflow port 33 or the outflow port 34 along the passage direction α, the measurement inlet 35 cannot be seen.

In the bypass flow channel 30, since the measurement inlet 35 does not face the side of the inflow port 33, a dynamic pressure of the forward flow flowing from the inflow port 33 is less likely to be applied to the measurement inlet 35. For that reason, the flow velocity of the air in the measurement flow channel 32 tends to increase. In the above configuration, even if foreign matter such as dust, dust, waterdrops, and oil droplets enter the passage flow channel 31 from the inflow port 33 together with the forward flow, the foreign matter hardly enters the branch path 32a from the passage flow channel 31. In that case, since the foreign matter reaching the flow rate detector 22 in the measurement flow channel 32 is less likely to break the flow rate detector 22 or adhere to the flow rate detector 22, the detection accuracy of the flow rate detector 22 can be inhibited from being lowered by the foreign matter.

Further, in the bypass flow channel 30, since the measurement inlet 35 does not face the outflow port 34 side, the dynamic pressure of the backward flow flowing from the outflow port 34 is hardly applied to the measurement inlet 35. For that reason, the backward flow flowing in from the outflow port 34 is inhibited from flowing into the branch path 32a.

Figure 4:
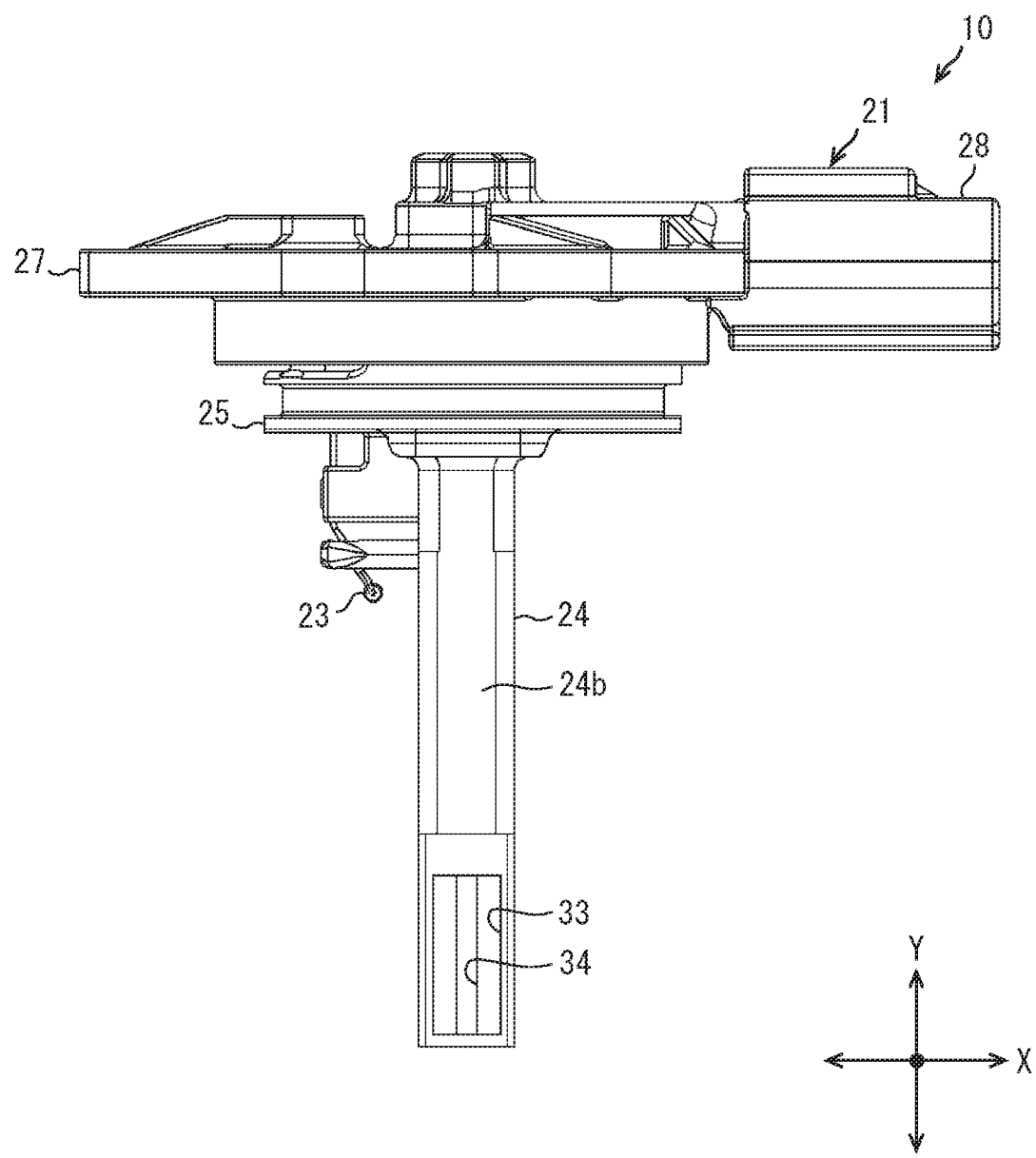
FIG. 4 is a side view of the air flow meter as viewed from a connector portion side.
Figure 5:
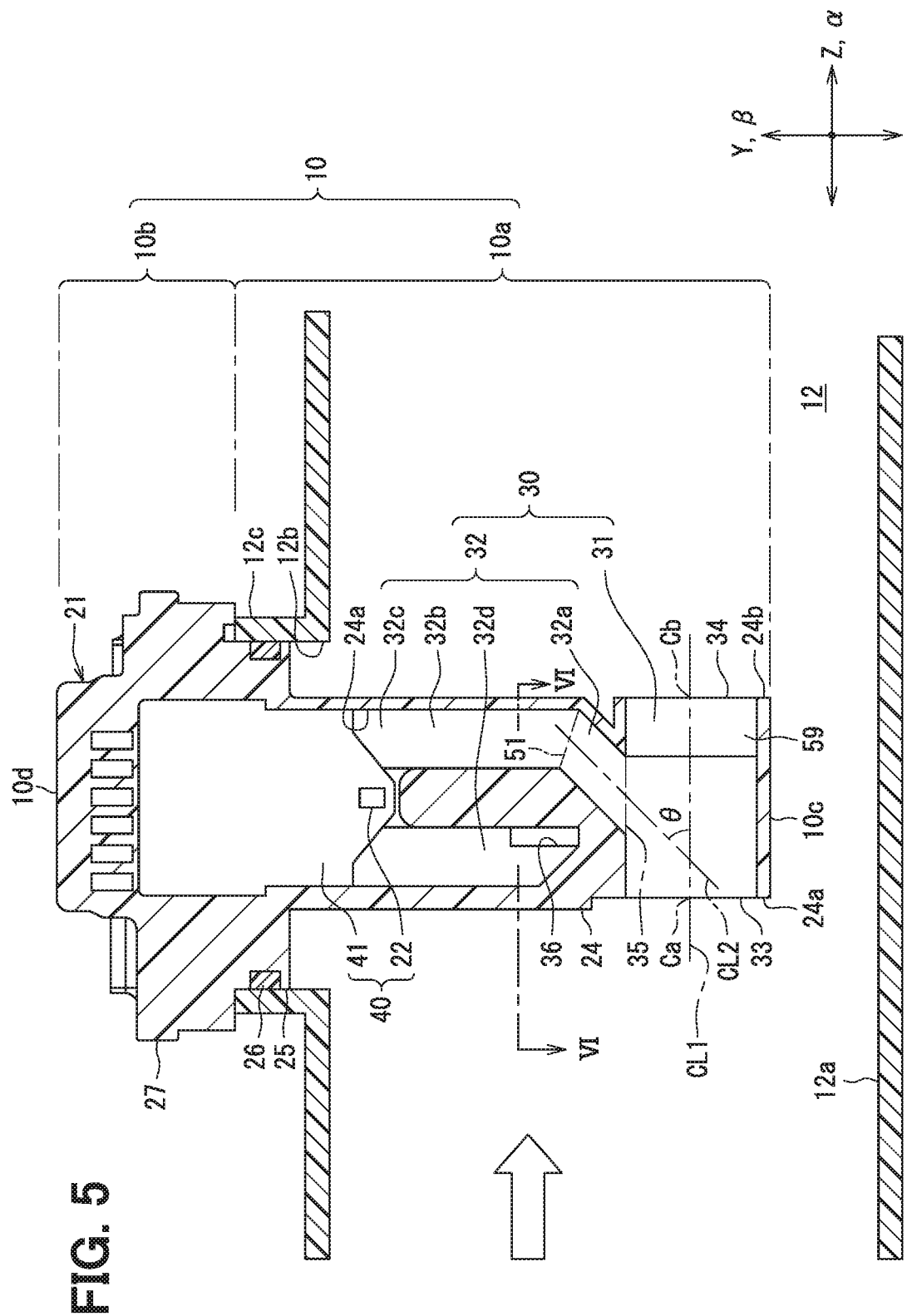
FIG. 5 is a longitudinal cross-sectional view of the air flow meter in a state of being attached to an intake pipe.

As shown in FIG. 4, in the passage flow channel 31, the open area of the outflow port 34 is smaller than the open area of the inflow port 33. While the height dimension of the outflow port 34 and the height dimension of the inflow port 33 are the same in the height direction Y, the width dimension of the outflow port 34 in the width direction X is smaller than the width dimension of the inflow port 33. In that case, when the inflow port 33 is projected toward the outflow port 34 in the passage direction α, a part of the projection region overlaps with the outflow port 34. On the other hand, when the outflow port 34 is projected toward the inflow port 33 in the passage direction α, the entire projection region overlaps with the inflow port 33.

In the present embodiment, because the depth direction Z and the passage direction α coincide with each other, a part of a projection region of the inflow port 33 overlaps with the outflow port 34 in the flow direction of the air in the intake passage 12. In this case, the foreign matter that has entered the passage flow channel 31 from the inflow port 33 together with the air moves ahead straight in the flow direction of the intake passage 12 as it is, so that the foreign matter is easily discharged to the outside from the outflow port 34, as a result of which the foreign matter hardly enters the measurement flow channel 32. In addition, in the configuration in which the open area of the outflow port 34 is smaller than the open area of the inflow port 33, the forward flow flowing through the passage flow channel 31 is less likely to flow out from the outflow port 34, while the forward flow is likely to flow into the branch path 32a from the measurement inlet 35. For that reason, the flow velocity of the air in the measurement flow channel 32 tends to increase, as a result of which, the detection accuracy by the flow rate detector 22 increases.

The inner peripheral surface of the passage flow channel 31 has a passage throttle surface 59 for throttling the passage flow channel 31. The passage throttle surface 59 gradually decreases the flow channel area of the passage flow channel 31 toward the outflow port 34 in the passage direction α, and a pair of passage throttle surfaces 59 are provided in the width direction X over the passage ceiling surface 55 and the passage floor surface 56. The passage throttle surfaces 59 extend from the outflow port 34 toward the inflow port 33, and extend over the outflow ceiling surface 55b and the passage floor surface 56.

When a state of the pulsation generated in the intake passage 12 is referred to as a pulsation characteristic, the pulsation characteristic measured by the air flow meter 10 by use of the detection result of the flow rate detector 22 may include an error with respect to the pulsation characteristic of the pulsation actually generated in the intake passage 12. The case where an error is included in the pulsation characteristic measured by the air flow meter 10 includes a case where the backward flow flowing in from the outflow port 34 enters the measurement flow channel 32 from the passage flow channel 31.

Figure 8:
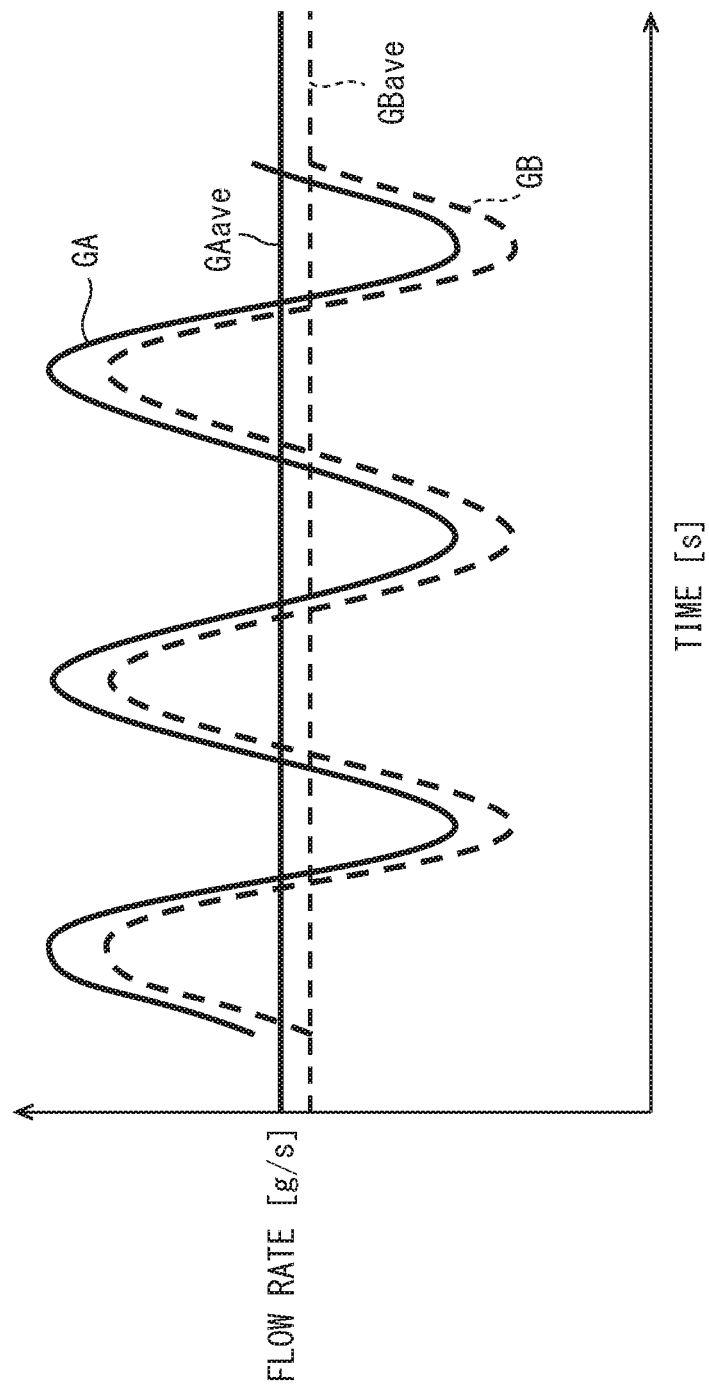
FIG. 8 is a diagram showing a change mode of a flow rate.

In this example, the flow rate measured by the air flow meter 10 is referred to as a flow rate measurement value GA, an average value of the flow rate measurement values GA is referred to as a measurement average value GAave, the actual flow rate of the intake air flowing through the intake passage 12 is referred to as an actual flow rate GB, and an average value of the actual flow rate GB is referred to as an actual average value GBave. As shown in FIG. 8, when the flow rate measurement value GA becomes smaller than the actual flow rate GB due to the inclusion of an error in the flow rate measurement value GA, the measurement average value GAave also becomes smaller than the actual average value GBave.

Figure 9:
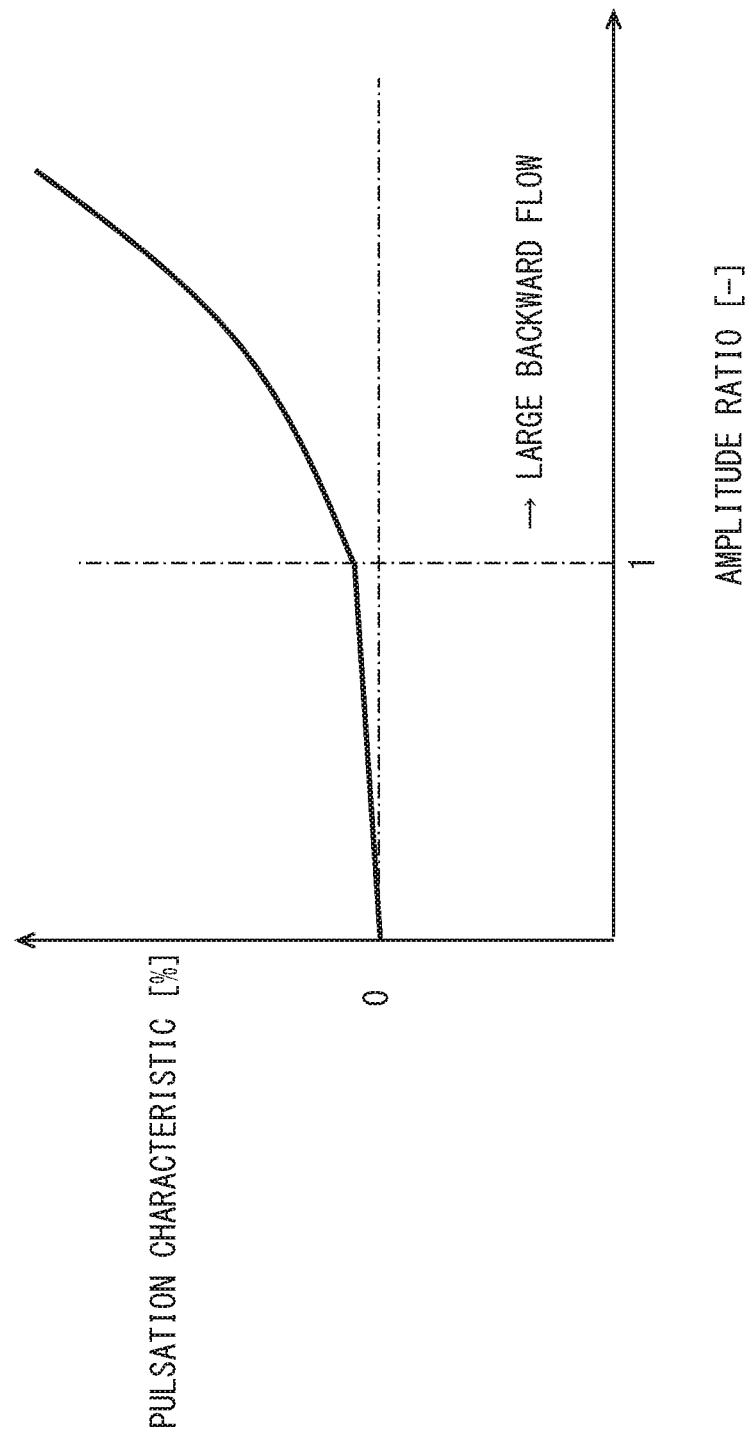
FIG. 9 is a graph showing a relationship between a pulsation characteristic and an amplitude ratio.

The pulsation characteristics can be quantified by a value obtained by dividing a difference between the measurement average value GAave and the actual average value GBave by the actual average value GBave. In this instance, a mathematical expression for calculating the pulsation characteristics is expressed as (GAave−GBave)/GBave. The value of the pulsation characteristic tends to increase as the amplitude of the pulsation increases. For example, when a value obtained by dividing a difference between the maximum value GBmax of the actual flow rate GB and the actual average value GBave by the actual average value GBave is referred to as an amplitude ratio, as shown in FIG. 9, a numerical value of the pulsation characteristic increases as the amplitude ratio increases. In particular, in a region where the amplitude ratio is larger than 1, the rate of increase of the pulsation characteristic with an increase in the amplitude ratio is large. In this example, as the amplitude ratio is larger, the amount of the backward flow from the outflow port 34 becomes larger. A mathematical expression for calculating the amplitude ratio can be expressed as (GBmax−GBave)/GBave.

Figure 10:
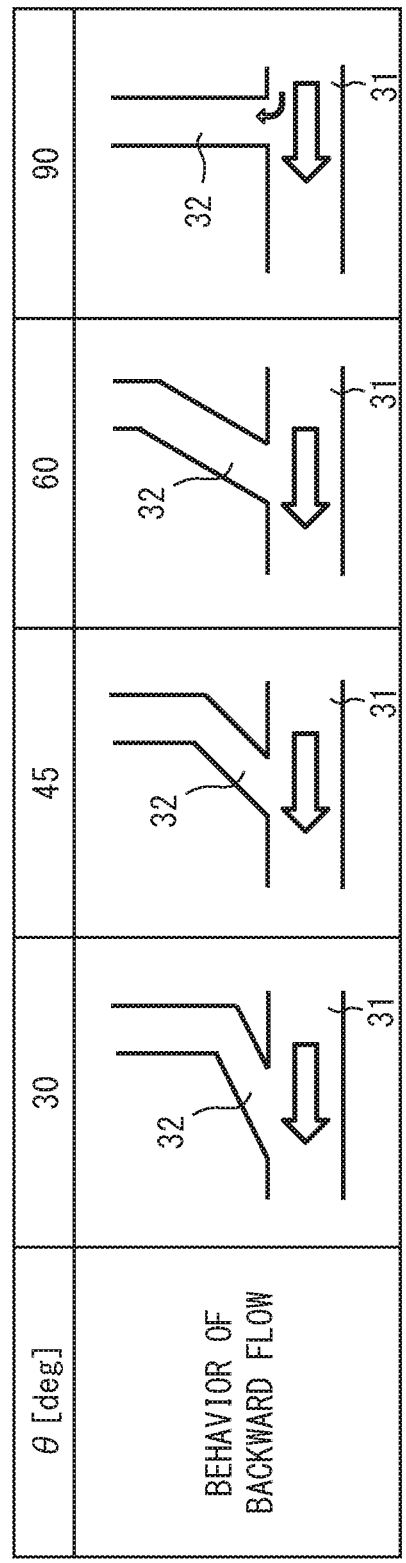
FIG. 10 is a diagram illustrating a configuration in which branch angles are different from each other.

In the present embodiment, the branch angle θ is set to, for example, 40 degrees, but a numerical value of the pulsation characteristic is likely to be changed in accordance with the branch angle θ. For example, as shown in FIG. 10, in the configuration in which the branch angle θ is 30 degrees, 45 degrees, 60 degrees, or 90 degrees, when the backward flow flows into the passage flow channel 31 from the outflow port 34, the backward flow is less likely to flow into the measurement flow channel 32 with the configuration in which the branch angle θ is 30 degrees, 45 degrees, or 60 degrees. On the other hand, in the configuration in which the branch angle θ is 90 degrees, the backward flow is likely to flow into the measurement flow channel 32. In this case, the detection accuracy of the pulsation characteristic by the air flow meter 10 is apt to be lowered.

Figure 11:
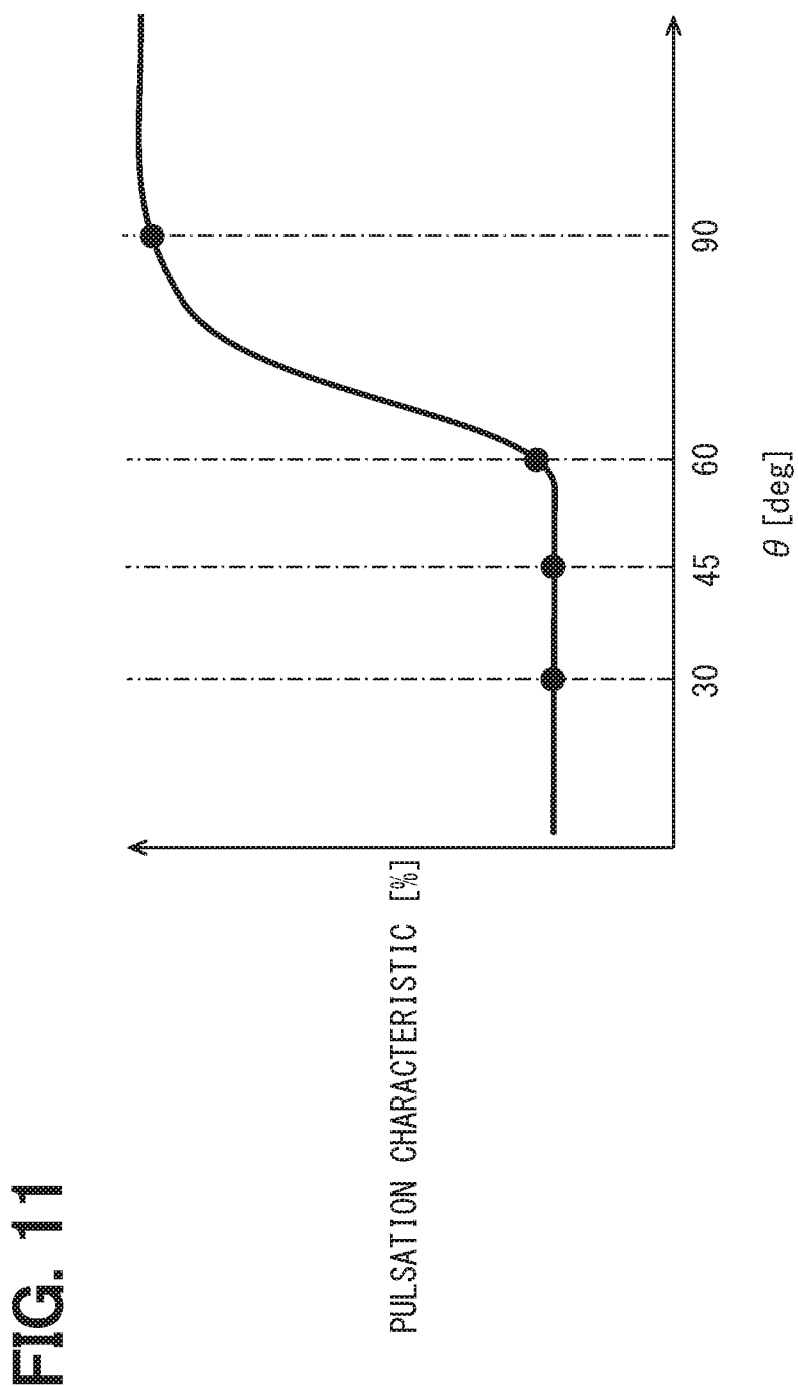
FIG. 11 is a diagram showing a relationship between the branch angle and the pulsation characteristic.

In the air flow meter 10, it is considered that the tendency of the backward flow flowing into the measurement flow channel 32 differs depending on the branch angle θ, as a result of which the numerical values of the pulsation characteristic differs from each other. For example, as shown in FIG. 11, in the configuration in which the branch angle θ is 60 degrees or less, the numerical value of the pulsation characteristic is a relatively small value. It is considered that this is attributable to a phenomenon that when the branch angle θ is equal to or less than 60 degrees, the backward flow is less likely to flow into the measurement flow channel 32. On the other hand, in the configuration in which the branch angle θ is larger than 60 degrees, the numerical value of the pulsation characteristic is relatively large. This is considered to be attributable to the phenomenon that when the branch angle θ is larger than 60 degrees, the backward flow is likely to flow into the measurement flow channel 32. In addition, in the above configuration, the numerical value of the pulsation characteristic increases as the branch angle θ increases. This is considered to be attributable to the phenomenon that, in a range in which the branch angle θ is larger than 60 degrees, as the branch angle θ is larger, the backward flow is likely to flow into the measurement flow channel 32.

According to the present embodiment described above, in the configuration in which the branch angle θ is equal to or less than 60 degrees, there is a need to swirl sharply in order for the backward flow flowing from the outflow port 34 to flow into the branch path 32a from the passage flow channel 31, so that a phenomenon that the backward flow is less likely to flow into the branch path 32a is likely to occur. For that reason, the backward flow can be inhibited from reaching the flow rate detector 22. This makes it difficult for the air flow meter 10 to measure the flow rate on the assumption that the forward flow flowing in from the inflow port 33 reaches the flow rate detector 22 even though the backward flow flowing in from the outflow port 34 actually reaches the flow rate detector 22. Therefore, the measurement accuracy of the flow rate of the intake air by the air flow meter 10 can be improved.

Further, in the configuration in which the branch angle θ is equal to or less than 60 degrees, when the forward flow flows into the branch path 32a from the passage flow channel 31, the direction of the forward flow may be gradually changed toward the branch path 32a. In the above configuration, as described above, the backward flow is less likely to flow into the branch path 32a, while the forward flow is likely to flow into the branch path 32a. In that case, since the flow velocity of the forward flow flowing into the measurement flow channel 32 is inhibited from being insufficient, the detection accuracy of the flow rate of the forward flow flowing in from the inflow port 33 by the flow rate detector 22 can be enhanced.

According to the present embodiment, in the configuration in which the first orthogonal distance Da is equal to or greater than the second orthogonal distance Db, the inflow branch surface 57 is sufficiently long in the direction in which the branch coincident line CL2 extends as compared with the width dimension of the branch path 32a in the passage direction α. In the above configuration, a phenomenon is likely to occur in which the backward flow flowing in from the inflow port 33 flows toward the inflow branch surface 57 without being able to swirl sharply, and is pushed back toward the passage flow channel 31 by the inflow branch surface 57 in the vicinity of the measurement inlet 35, thereby making it difficult for the backward flow to flow into the branch path 32a. For that reason, the backward flow can be inhibited from reaching the flow rate detector 22.

Further, in the configuration in which the first orthogonal distance Da is equal to or greater than the second orthogonal distance Db, when the forward flow flows from the passage flow channel 31 into the branch path 32a, the forward flow does not flow toward the inflow branch surface 57, but may flow along the inflow branch surface 57. In the above configuration, the inflow branch surface 57 can inhibit the backward flow from flowing into the branch path 32a as described above, while the inflow branch surface 57 can promote the forward flow from flowing into the branch path 32a.

Moreover, since the air flow meter 10 has both a configuration in which the branch angle θ is equal to or less than 60 degrees and a configuration in which the first orthogonal distance Da is equal to or more than the second orthogonal distance Db, the backward flow flowing into the branch path 32a is restricted by both the branch angle θ and the inflow branch surface 57. In that case, the measurement accuracy of the flow rate by the air flow meter 10 can be further enhanced. Further, in that case, since the forward flow flowing into the branch path 32a is promoted by both the branch angle θ and the inflow branch surface 57, the accuracy of the detection of the flow rate by the flow rate detector 22 can be further enhanced.

According to the present embodiment, the first inlet distance Dc is equal to or less than the second inlet distance Dd. For that reason, in order for the backward flow flowing in from the outflow port 34 to flow into the branch path 32a, the backward flow flowing toward the inflow port 33 side in the passage flow channel 31 is required to largely go around so as to pass through the outflow ceiling surface 55b and the outflow branch surface 58 once, and then return to the outflow port 34 side again. In that case, since the position and the angle at which the backward flow flows into the branch path 32a are limited by the outflow ceiling surface 55b and the outflow branch surface 58, the inflow of the backward flow into the branch path 32a can be inhibited by the outflow ceiling surface 55b and the outflow branch surface 58 in addition to the branch angle θ and the inflow branch surface 57.

According to the present embodiment, the CL7 is provided between the inflow orthogonal line CL4 and the outflow orthogonal line CL5. In this case, since the outflow ceiling surface 55b does not extend closer to the inflow port 33 than the guide path 32b in the passage direction α, the guide path 32b is opened toward the passage flow channel 31 through the branch path 32a in the orthogonal direction β. For that reason, when the forward flow flowing in from the inflow port 33 flows into the branch path 32a, a pressure loss to which the forward flow is subjected in the branch path 32a is likely to be reduced, as a result of which the forward flow is likely to flow into the branch path 32a.

According to the present embodiment, since the outflow branch distance Hb is equal to or less than the branch inlet-outlet distance De, when the backward flow flowing in from the outflow port 34 largely turns around the outflow ceiling surface 55b and the outflow branch surface 58 from the side of the measurement inlet 35, the backward flow can rapidly turn at an acute angle. In that case, an angle of the outflow branch surface 58 with respect to the outflow ceiling surface 55b can be set to an appropriate angle in order to rapidly swirl the backward flow from the side of the measurement inlet 35 at an acute angle. In addition, in particular, when the configuration in which the outflow branch distance Hb is equal to or less than the branch inlet-outlet distance De is applied to the configuration in which the first orthogonal distance Da is equal to or more than the second orthogonal distance Db, the backward flow largely going around from the side of the measurement inlet 35 tends to be directed toward the inflow branch surface 57. In that case, since the function of the inflow branch surface 57 that pushes back the backward flow to the passage flow channel 31 side is easily exerted in the vicinity of the measurement inlet 35, the backward flow can be more reliably inhibited from flowing into the branch path 32a.

According to the present embodiment, a configuration in which the branch angle θ is equal to or less than 60 degrees or a configuration in which the first orthogonal distance Da is equal to or more than the second orthogonal distance Db is realized such that the branch inlet-outlet distance De is smaller than the passage distance Df. For that reason, the housing 21 can be avoided from becoming larger in size in order to realize a configuration in which the backward flow flowing into the branch path 32a is restricted by both the branch angle θ and the inflow branch surface 57. In that case, with a reduction in the size of the housing 21, the air flow of the intake air flowing through the intake passage 12 is hardly disturbed in the periphery of the housing 21, so that the detection accuracy of the flow rate detector 22 can be improved.

According to the present embodiment, the branch path 32a extends straight along the branch coincident line CL2. For that reason, simplification and ease of the inspection can be realized when inspecting the shape and dimensions of the branch path 32a at the time of manufacturing the housing 21 having a configuration in which the backward flow flowing into the branch path 32a is restricted by both the branch angle θ and the inflow branch surface 57. As a result, the inspection accuracy of the branch path 32a can be improved. In addition, the passage flow channel 31 extends straight along the passage line CL1. For that reason, similarly to the branch path 32a, the inspection accuracy of the passage flow channel 31 at the time of manufacturing can be enhanced.

According to the present embodiment, since the measurement inlet 35 is along the passage line CL1, the measurement inlet 35 does not face either the inflow port 33 or the outflow port 34. This makes it possible to inhibit both the entry of the foreign matter flowing in from the inflow port 33 together with the forward flow into the measurement inlet 35 from the passage flow channel 31, and the entry of the forward flow flowing in from the outflow port 34 into the measurement inlet 35 from the passage flow channel 31.

According to the present embodiment, since the open area of the outflow port 34 is smaller than the open area of the inflow port 33, the backward flow generated in the intake passage 12 is less likely to flow into the outflow port 34. Therefore, the backward flow flowing into the branch path 32a can be more surely inhibited.

Second Embodiment

In the first embodiment, the measurement inlet 35 is parallel to the passage line CL1, but in a second embodiment, a measurement inlet 35 is inclined with respect to a passage line CL1. In the present embodiment, differences from the first embodiment will be mainly described.

Figure 12:
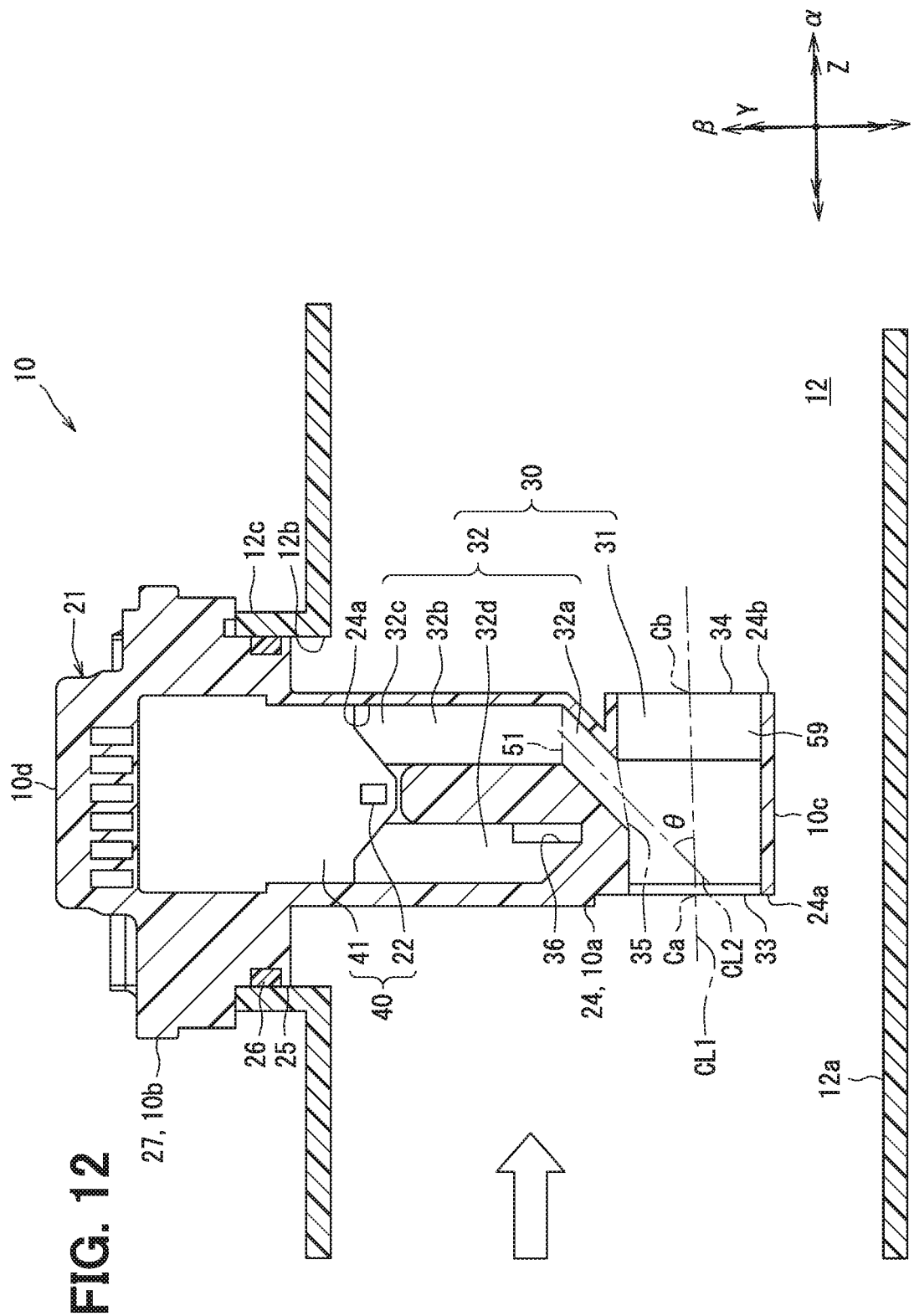
FIG. 12 is a longitudinal cross-sectional view of an air flow meter in a state of being attached to an intake pipe according to a second embodiment.
Figure 13:
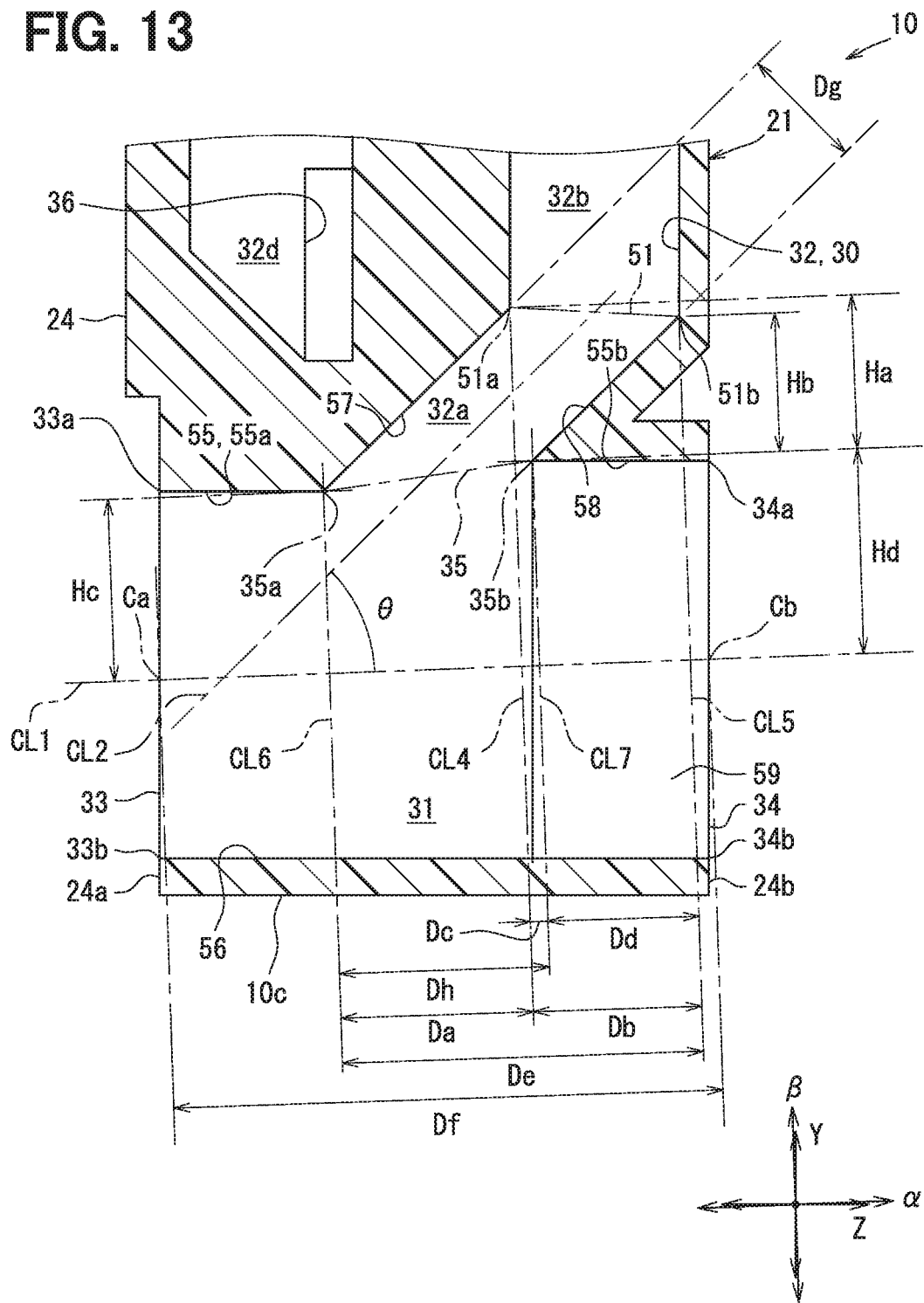
FIG. 13 is an enlarged view of a periphery of a measurement inlet in FIG. 12.

As shown in FIGS. 12 and 13, an inflow ceiling surface 55a and an outflow ceiling surface 55b both extend parallel to a passage floor surface 56, while the outflow ceiling surface 55b is provided at a position closer to an air flow base end face 10d than the inflow ceiling surface 55a in the height direction Y. In this instance, the center Cb of the outflow port 34 is disposed at a position closer to the air flow base end face 10d than a center Ca of an inflow port 33, and a passage line CL1 is inclined with respect to each of the passage floor surface 56, the inflow ceiling surface 55a, and the outflow ceiling surface 55b accordingly. A passage direction α, which is a direction in which the passage line CL1 extends, does not coincide with the depth direction Z, and is inclined with respect to the depth direction Z. Accordingly, an orthogonal direction β does not coincide with the height direction Y, but is inclined with respect to the height direction Y.

The measurement inlet 35 is inclined with respect to the passage line CL1, the passage floor surface 56, the inflow ceiling surface 55a, and the outflow ceiling surface 55b. In both the passage direction α and the depth direction Z, the measurement inlet 35 faces the side of the outflow port 34, and when a person looks into the inside of a passage flow channel 31 from the outflow port 34, the measurement inlet 35 can be seen. In other words, the measurement inlet 35 does not face the inflow port 33, and even if a person looks into the passage flow channel 31 from the inflow port 33, the measurement inlet 35 cannot be seen. In this case, unlike the first embodiment, in the orthogonal direction β, an outflow inlet distance Hd is larger than an inflow inlet distance Hc. In other words, a relationship of Hd>Hc is established. For that reason, the foreign matter flowing in from the inflow port 33 together with the forward flow can be more surely inhibited from entering the measurement flow channel 32 from the passage flow channel 31. This is because even if an advancing direction of the foreign matter advancing along with the forward flow in the passage flow channel 31 is slightly changed to the side of the measurement inlet 35, the foreign matter does not enter the measurement inlet 35 but strikes the outflow ceiling surface 55b and rebounds to the side of the outflow port 34, whereby the foreign matter is discharged to the outside from the outflow port 34.

In the present embodiment, unlike the first embodiment, a branch surface distance Dg, which is a width dimension of a branch path 32a, is smaller than a second orthogonal distance Db, which is a width dimension of a guide path 32b. In this case, a flow channel area of the branch path 32a is smaller than a flow channel area of the guide path 32b. Further, in this instance, since the measurement inlet 35 is inclined with respect to the passage line CL1, even if an open area of the measurement inlet 35 is increased as compared with the configuration in which the measurement inlet 35 is parallel to the passage line CL1, the open area of the measurement inlet 35 is decreased by an amount corresponding to the narrowing amount of the branch path 32a. For that reason, the backward flow flowing in from the outflow port 34 is less likely to flow into the measurement inlet 35 from the passage flow channel 31.

Third Embodiment

In the first embodiment, the passage floor surface 56 extends straight between the inflow port 33 and the outflow port 34 in the depth direction Z, but in a third embodiment, a passage floor surface 56 does not extend straight. In other words, in the present embodiment, a passage flow channel 31 does not extend straight. In the present embodiment, differences from the first embodiment will be mainly described.

Figure 14:
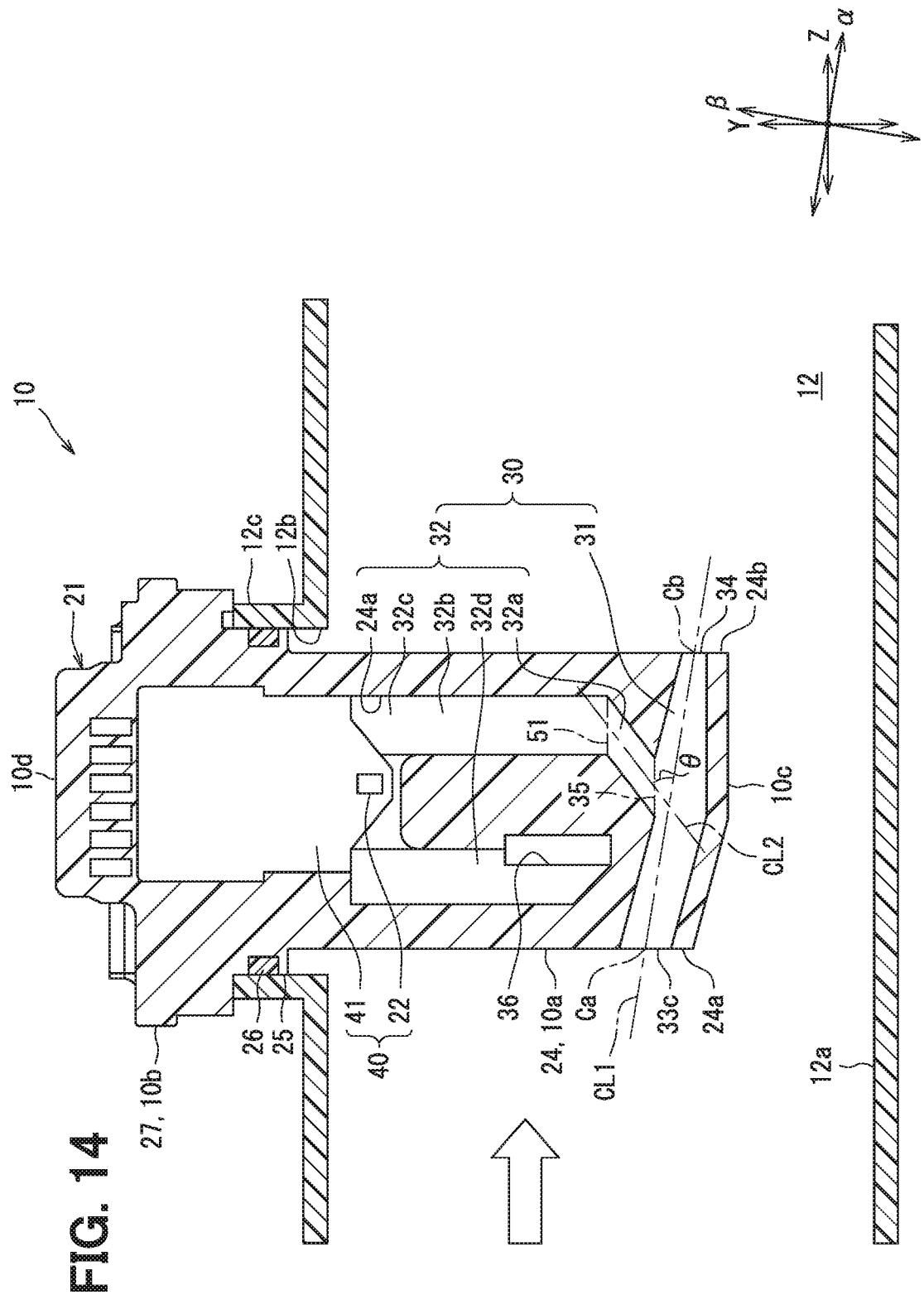
FIG. 14 is a longitudinal cross-sectional view of an air flow meter in a state of being attached to an intake pipe according to a third embodiment.

As shown in FIGS. 14 and 15, the passage floor surface 56 has an inflow floor surface 56a extending downstream from an inflow port 33 and an outflow floor surface 56b extending upstream from an outflow port 34. While the outflow floor surface 56b is orthogonal to the height direction Y, the inflow floor surface 56a is inclined with respect to the height direction Y. An inflow ceiling surface 55a and an outflow ceiling surface 55b are inclined with respect to the height direction Y, and both extend parallel to the inflow floor surface 56a.

In the present embodiment, a passage line CL1 is inclined with respect to each of the inflow ceiling surface 55a, the outflow ceiling surface 55b, the inflow floor surface 56a, and the outflow floor surface 56b. In this instance, as in the second embodiment, a passage direction α, which is a direction in which the passage line CL1 extends, does not coincide with the depth direction Z, but is inclined with respect to the depth direction Z. For that reason, an orthogonal direction β is also inclined with respect to the height direction Y.

Similar to the first embodiment, a measurement inlet 35 extends in the depth direction Z. Also, in this case, in the present embodiment, since the passage direction α is inclined with respect to the depth direction Z, the measurement inlet 35 is inclined relatively with respect to the passage line CL1 in the passage direction, as in the second embodiment described above. For that reason, similarly to the second embodiment, an outflow inlet distance Hd is larger than an inflow inlet distance Hc, and foreign matter flowing into the passage flow channel 31 from the inflow port 33 together with a forward flow hardly enters the branch path 32a.

In the present embodiment, the outflow port 34 is provided on an air flow tip end face 10c side with respect to the inflow port 33 in the height direction Y. Specifically, in the height direction Y, an end 34a of the outflow port 34 on the side of the passage ceiling surface 55 is provided on the side of the air flow tip end face 10c with respect to an end 33b of the inflow port 33 on the side of the passage floor surface 56. In this case, even if the inflow port 33 is projected toward the outflow port 34 in the passage direction α, the projection region does not overlap with the outflow port 34. Similarly, even if the outflow port 34 is projected toward the inflow port 33 in the passage direction α, the projection region does not overlap with the inflow port 33.

As described above, since the inflow port 33 and the outflow port 34 are located at positions deviated in the height direction Y, a direction in which the forward flow flows in the intake passage 12 and a direction in which the forward flow flows in the passage flow channel 31 are different from each other. In this case, since a pressure loss when the forward flow flowing in from the inflow port 33 flows out from the outflow port 34 tends to be large, the forward flow tends to flow into the branch path 32a from the measurement inlet 35.

Fourth Embodiment

In the first embodiment, the measurement outlet 36 is provided closer to the inflow port 33 than the guide path 32b in the depth direction Z, but in the fourth embodiment, a measurement outlet 36 is provided closer to an outflow port 34 than a guide path 32b in the depth direction Z. In the present embodiment, differences from the first embodiment will be mainly described.

Figure 16:
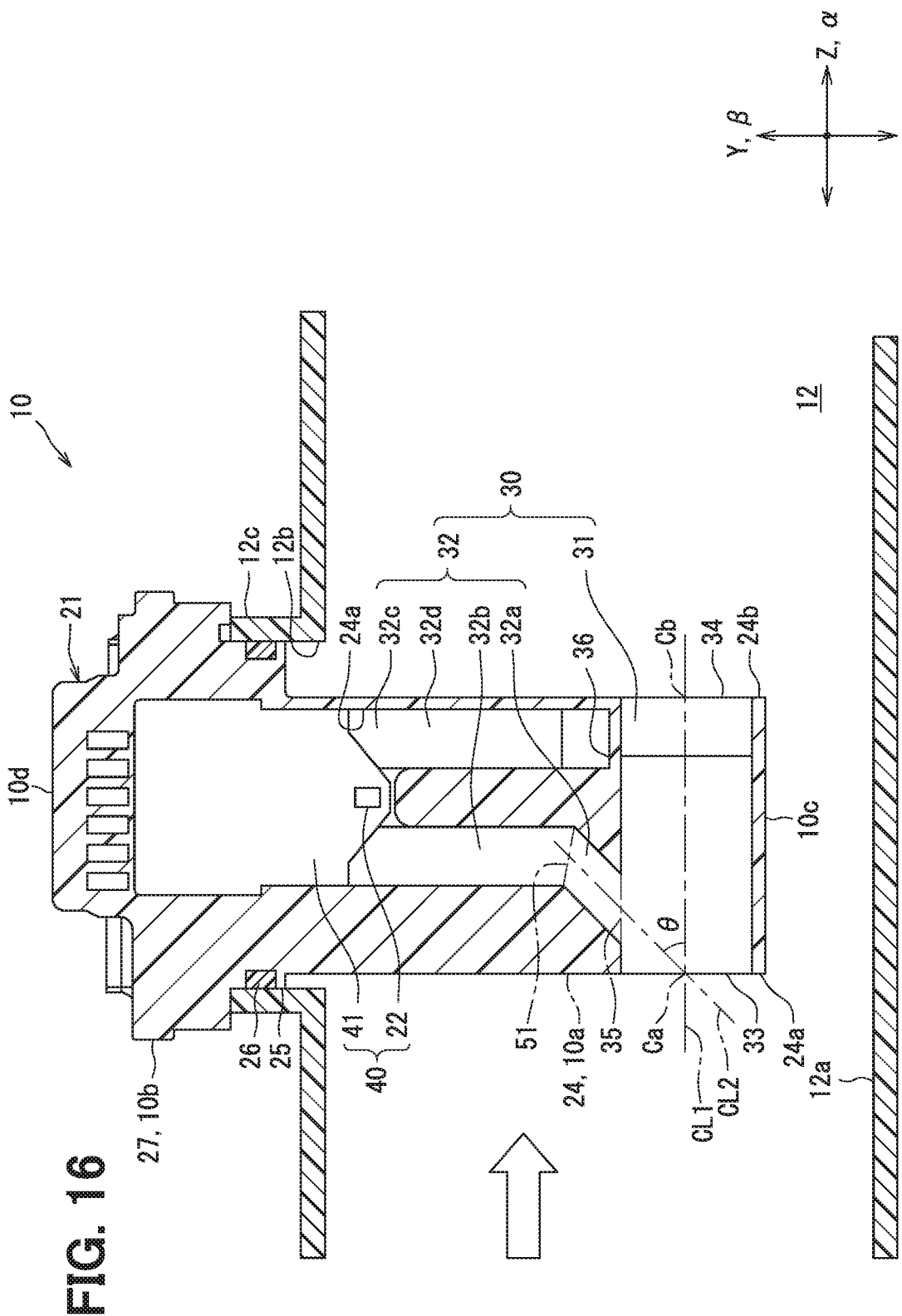
FIG. 16 is a longitudinal cross-sectional view of an air flow meter in a state of being attached to an intake pipe according to a fourth embodiment.
Figure 17:
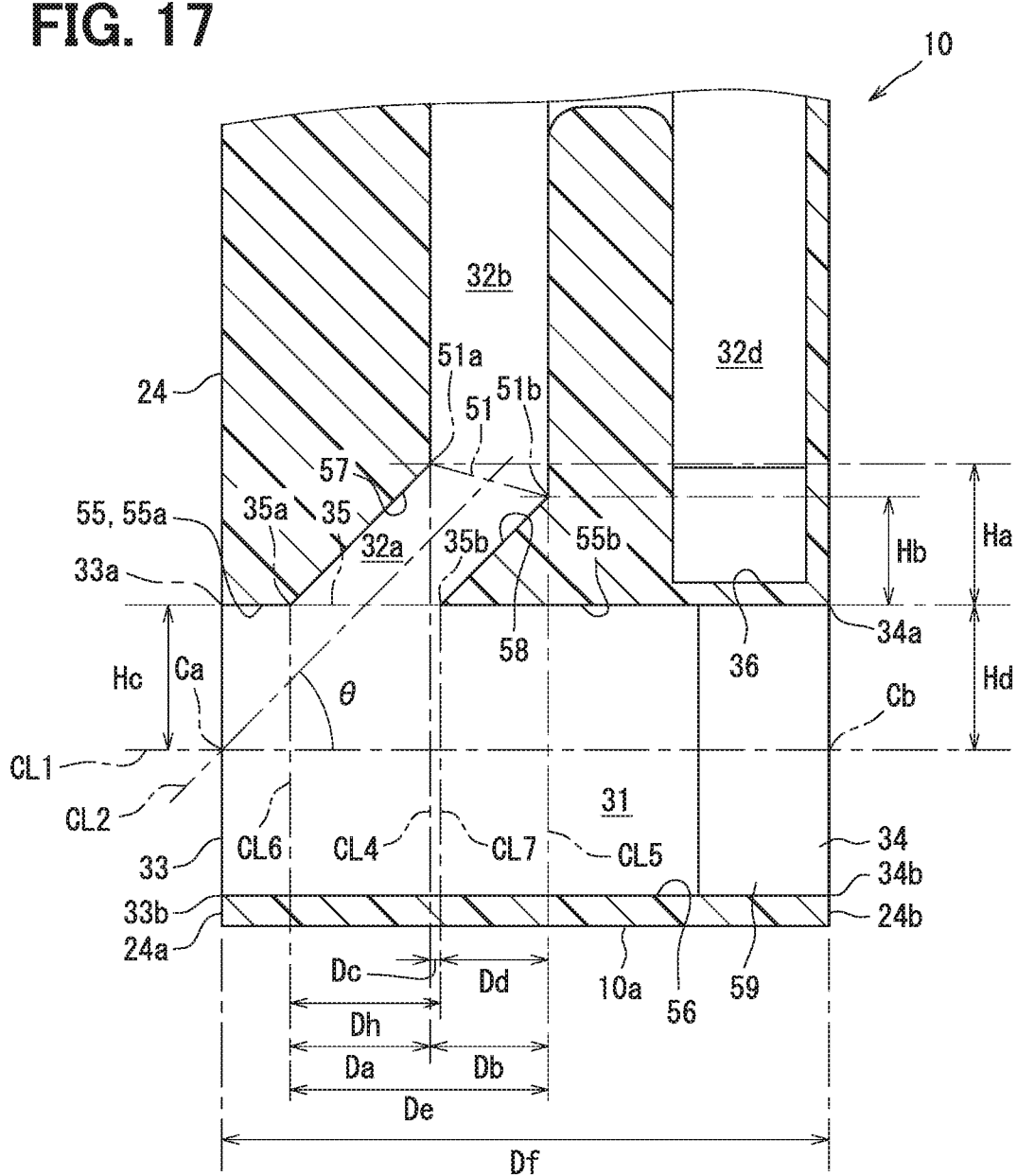
FIG. 17 is an enlarged view of a periphery of a measurement inlet in FIG. 16.

As shown in FIGS. 16 and 17, in the depth direction Z, a discharge path 32d is provided closer to the outflow port 34 than either a branch path 32a or the guide path 32b. A detection path 32c extends from the guide path 32b toward the outflow port 34 in the depth direction Z. Even in this case, the discharge path 32d extends from a measurement outlet 36 toward an upstream side of a measurement flow channel 32. In the above configuration, unlike the first embodiment, an air flowing from a measurement inlet 35 to the measurement outlet 36 in the measurement flow channel 32 flows from the inflow port 33 to the outflow port 34 in the passage direction α in the detection path 32c.

Other Embodiments

Although the multiple embodiments according to the present disclosure have been described above, the present disclosure is not construed as being limited to the abovementioned embodiments, and can be applied to various embodiments and combinations within a scope not departing from the spirit of the present disclosure.

As Modification 1, the outflow inlet line CL7 may be disposed not between the inflow orthogonal line CL4 and the outflow orthogonal line CL5, but between the inflow orthogonal line CL4 and the inflow inlet line CL6. In other words, in the passage direction α, the outflow side edge 35b of the measurement inlet 35 may be disposed closer to the inflow port 33 than the inflow side edge 51a of the branch downstream port 51. In this instance, the outflow inlet line CL7 is separated from the inflow orthogonal line CL4 not to the outflow port 34 side but to the inflow port 33 side, but the first inlet distance Dc, which is the separation distance between the outflow inlet line CL7 and the inflow orthogonal line CL4, is not changed to be smaller than the second inlet distance Dd. For that reason, a relationship of Dc≤Dd is established.

In the above configuration, the entire branch downstream port 51 is covered from the passage flow channel 31 side by the outflow ceiling surface 55b and the outflow branch surface 58. In this case, in order for the backward flow flowing from the inflow port 33 into the passage flow channel 31 to flow into the branch path 32a, there is a need to further return to the outflow branch surface 58 side after going around the outflow ceiling surface 55b from the measurement inlet 35 side, and therefore, thereby making it possible to more reliably inhibit the backward flow from flowing into the branch path 32a.

In Modification 2, the inflow branch surface 57 and the outflow branch surface 58 may not extend in parallel to each other in the branch path 32a. Even in this instance, if the branch coincident line CL2 extends straight, the branch angle θ which is the inclination angle of the branch coincident line CL2 with respect to the passage line CL1 can be set. Even if the inflow branch surface 57 and the outflow branch surface 58 are not parallel to each other, when the inflow branch surface 57 and the outflow branch surface 58 extend from the measurement inlet 35 to the outflow port 34 side in the passage direction α, the branch path 32a extends from the measurement inlet 35 to the outflow port 34 side in the passage direction α.

In Modification 3, the branch path 32a may not extend straight from the measurement inlet 35 but may be bent. In other words, the center line of the branch path 32a may be bent without extending straight. In the configuration in which the center line of the branch path 32*a* is bent, a tangent line of the center line of the branch path 32*a* is assumed at the measurement inlet 35, and a virtual straight line obtained by extending the tangent line at least toward the passage flow channel 31 is taken as a branch coincident line CL2. As a result, even in the configuration in which the branch path 32*a* is bent, the branch angle θ, which is the inclination angle of the branch coincident line CL2 with respect to the passage line CL1, can be set. Even in this instance, the branch coincident line CL2 coincides with the center line of the branch path 32*a* at the measurement inlet 35.

Further, in the configuration in which the branch path 32*a* is bent, a portion of the inflow branch surface 57 closest to the outflow port 34 in the passage direction α is not necessarily limited to the inflow side edge 51*a* of the branch downstream port 51. For example, an intermediate portion of the inflow branch surface 57 between the inflow side edge 35*a* of the measurement inlet 35 and the inflow side edge 51*a* of the branch downstream port 51 may be a portion closest to the outflow port 34 in the passage direction α. Even in this instance, if the passage line CL1 can be assumed for the passage flow channel 31, the passage direction α and the orthogonal direction β can be assumed for the branch path 32*a*. For that reason, a portion of the inflow branch surface 57 closest to the outflow port 34 in the passage direction α can be set and the inflow orthogonal line CL4 passing through the portion can be assumed.

Also, a portion of the outflow branch surface 58 closest to the outflow port 34 in the passage direction α is not necessarily limited to the outflow side edge 51*b* of the branch downstream port 51. For example, an intermediate portion of the outflow branch surface 58 between the outflow side edge 35*b* of the measurement inlet 35 and the outflow side edge 51*b* of the branch downstream port 51 may be a portion closest to the outflow port 34 in the passage direction α. Even in this instance, if the passage line CL1 can be assumed, a portion closest to the outflow port 34 in the passage direction α and the outflow orthogonal line CL5 can be assumed.

As Modification 4, the air flow meter 10 may have only one of a configuration in which the branch angle θ is equal to or less than 60 degrees and a configuration in which the first orthogonal distance Da is equal to or more than the second orthogonal distance Db. For example, in the air flow meter 10 in which the first orthogonal distance Da is equal to or larger than the second orthogonal distance Db, at least one of the relationship of Dc≤Dd and the relationship of Hb≤De is established, as a result of which the backward flow can be inhibited from flowing into the branch path 32*a*. In other words, the same effects as those of the air flow meter 10 having both the configuration in which the branch angle θ is equal to or less than 60 degrees and the configuration in which the first orthogonal distance Da is equal to or more than the second orthogonal distance Db can be achieved.

As Modification 5, in the measurement flow channel 32, the flow rate detector 22 may be provided in the branch path 32*a*, the guide path 32*b*, and the discharge path 32*d*.

As Modification 6, in the measurement flow channel 32 through which a fluid such as an intake air flows, a temperature sensor for detecting a temperature of the fluid, a humidity sensor for detecting a humidity of the fluid, a pressure sensor for detecting a pressure, and the like may be provided as the physical quantity detector such as the flow rate detector 22.

As Modification 7, cross-sectional shapes of the passage flow channel 31 and the measurement flow channel 32 are not substantially rectangular, but may be substantially circular, elliptical, or the like. In the case of those configurations, it is assumed that the inflow side edge 35*a* and the outflow side edge 35*b* are apexes in the passage direction α in the measurement inlet 35. In that case, the inflow branch surface 57 extending from the inflow side edge 35*a* and the outflow branch surface 58 extending from the outflow side edge 35*b* are substantially linear, and those linear portions can also be referred to as the inflow branch surface 57 and the outflow branch surface 58. In other words, those linear portions correspond to an inflow inclined surface and an outflow inclined surface.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A physical quantity measurement device that measures a physical quantity of a fluid, the physical quantity measurement device comprising:
    a passage flow channel through which the fluid passes, the passage flow channel having an inflow port into which the fluid flows and an outflow port from which the fluid flows out, the physical quantity of the fluid being an object to be measured;
    a branch flow channel branched from the passage flow channel, the branch flow channel having a branch inlet into which the fluid flows from the passage flow channel; and
    a physical quantity detector that detects the physical quantity of the fluid in the branch flow channel, wherein
    a passage line is defined as a virtual straight line extending through both a center of the inflow port and a center of the outflow port,
    the branch flow channel has an inclined branch path inclined with respect to the passage flow channel, the inclined branch path extending from the branch inlet toward the outflow port along a passage direction in which the passage line extends,
    a branch coincident line is defined as a virtual straight line which coincides with a center line of the inclined branch path in the branch inlet, and
    an inclination angle of the branch coincident line with respect to the passage line is smaller than or equal to 60 degrees.

2. The physical quantity measurement device according to claim 1, wherein
    the passage flow channel extends straight along the passage line such that the branch inlet is along the passage line.

3. The physical quantity measurement device according to claim 1, wherein
    an open area of the outflow port is smaller than an open area of the inflow port.

4. A physical quantity measurement device that measures a physical quantity of a fluid, the physical quantity measurement device comprising:
    a passage flow channel through which the fluid passes, the passage flow channel having an inflow port into which the fluid flows and an outflow port from which the fluid flows out, the physical quantity of the fluid being an object to be measured;

a branch flow channel branched from the passage flow channel, the branch flow channel having a branch inlet into which the fluid flows from the passage flow channel; and a physical quantity detector that detects the physical quantity of the fluid in the branch flow channel, wherein a passage line is defined as a virtual straight line extending through both a center of the inflow port and a center of the outflow port, the branch flow channel has an inclined branch path inclined with respect to the passage flow channel, the inclined branch path extending from the branch inlet toward the outflow port along a passage direction in which the passage line extends, a branch coincident line is defined as a virtual straight line which coincides with a center line of the inclined branch path in the branch inlet, an inclination angle of the branch coincident line with respect to the passage line is smaller than or equal to 60 degrees, an inner peripheral surface of the inclined branch path includes:
  an inflow inclined surface extending along the branch coincident line from an inflow side edge of the branch inlet that is nearest to the inflow port in the passage direction in the branch inlet; and
  an outflow inclined surface extending along the branch coincident line from an outflow side edge of the branch inlet that is nearest to the outflow port in the passage direction in the branch inlet, and an inflow orthogonal line is defined as a virtual straight line orthogonal to the passage direction and extending through a portion of the inflow inclined surface that is nearest to the outflow port in the passage direction in the inflow inclined surface, an outflow orthogonal line is a defined as a virtual straight line orthogonal to the passage direction and extending through a portion of the outflow inclined surface that is nearest to the outflow port in the passage direction in the outflow inclined surface, and an outflow inlet line is defined as a virtual straight line orthogonal to the passage direction and extending through the outflow side edge of the branch inlet, a first inlet distance, which is a separation distance in the passage direction between the outflow inlet line and the inflow orthogonal line, is smaller than or equal to a second inlet distance which is a separation distance in the passage direction between the outflow inlet line and the outflow orthogonal line.

5. The physical quantity measurement device according to claim 4, wherein
  the outflow inlet line is between the inflow orthogonal line and the outflow orthogonal line in the passage direction.

6. The physical quantity measurement device according to claim 4, wherein
  an inflow port line is defined as a virtual straight line orthogonal to the passage direction and extending through the inflow side edge of the branch inlet,
  an outflow inclination distance, which is a separation distance in a direction orthogonal to the passage direction between the portion of the outflow inclined surface nearest to the outflow port in the passage direction in the outflow inclined surface and the outflow side edge of the branch inlet, is smaller than or equal to a branch inlet-outlet distance which is a separation distance in the passage direction between the outflow orthogonal line and the inflow inlet line.

7. The physical quantity measurement device according to claim 6, wherein
  the inclination angle is set to an angle at which the branch inlet-outlet distance is smaller than a passage distance which is a separation distance in the passage direction between the center of the inflow port and the center of the outflow port.

8. The physical quantity measurement device according to claim 4, wherein
  an outflow inlet distance, which is a separation distance in a direction orthogonal to the passage direction between the outflow side edge of the branch inlet and the passage line, is larger than an inflow inlet distance which is a separation distance in the direction orthogonal to the passage direction between the inflow side edge of the branch inlet and the passage line.

9. The physical quantity measurement device according to claim 4, wherein
  the inclined branch path extends straight along the branch coincident line such that the inflow inclined surface and the outflow inclined surface are parallel to each other.

10. A physical quantity measurement device that measures a physical quantity of a fluid, the physical quantity measurement device comprising:
  a passage flow channel through which the fluid passes, the passage flow channel having an inflow port into which the fluid flows and an outflow port from which the fluid flows out, the physical quantity of the fluid being an object to be measured;
  a branch flow channel branched from the passage flow channel, the branch flow channel having a branch inlet into which the fluid flows from the passage flow channel; and
  a physical quantity detector that detects the physical quantity of the fluid in the branch flow channel, wherein
  a passage line is defined as a virtual straight line extending through both a center of the inflow port and a center of the outflow port,
  the branch flow channel has an inclined branch path inclined with respect to the passage flow channel, the inclined branch path extending from the branch inlet toward the outflow port along a passage direction in which the passage line extends, and
  a branch coincident line is defined as a virtual straight line which coincides with a center line of the inclined branch path in the branch inlet,
  an inner peripheral surface of the inclined branch path includes:
    an inflow inclined surface extending along the branch coincident line from an inflow side edge of the branch inlet that is nearest to the inflow port in the passage direction in the branch inlet; and
    an outflow inclined surface extending along the branch coincident line from an outflow side edge of the branch inlet that is nearest to the outflow port in the passage direction in the branch inlet, and
  an inflow orthogonal line is defined as a virtual straight line orthogonal to the passage direction and extending through a portion of the inflow inclined surface that is nearest to the outflow port in the passage direction in the inflow inclined surface, an outflow orthogonal line is defined as a virtual straight line orthogonal to the passage direction and extending through a portion of the outflow inclined surface that is nearest to the outflow port in the passage direction in the outflow inclined surface, and an inflow inlet line is defined as a virtual straight line orthogonal to the passage direction and extending through the inflow side edge of the branch inlet, a first orthogonal distance, which is a separation distance in the passage direction between the inflow inlet line and the inflow orthogonal line, is larger than or equal to a second orthogonal distance which is a separation distance in the passage direction between the inflow orthogonal line and the outflow orthogonal line.

11. The physical quantity measurement device according to claim 10, wherein, an outflow inlet line is defined as a virtual straight line orthogonal to the passage direction and extending through the outflow side edge of the branch inlet, a first inlet distance, which is a separation distance in the passage direction between the outflow inlet line and the inflow orthogonal line, is smaller than or equal to a second inlet distance which is a separation distance in the passage direction between the outflow inlet line and the outflow orthogonal line.

12. The physical quantity measurement device according to claim 11, wherein the outflow inlet line is between the inflow orthogonal line and the outflow orthogonal line in the passage direction.

13. The physical quantity measurement device according to claim 10, wherein an outflow inclination distance, which is a separation distance in a direction orthogonal to the passage direction between the portion of the outflow inclined surface nearest to the outflow port in the passage direction in the outflow inclined surface and the outflow side edge of the branch inlet, is smaller than or equal to a branch inlet-outlet distance which is a separation distance in the passage direction between the outflow orthogonal line and the inflow inlet line.

14. The physical quantity measurement device according to claim 10, wherein a total of the first orthogonal distance and the second orthogonal distance is smaller than a passage distance which is a separation distance in the passage direction between the center of the inflow port and the center of the outflow port.

15. The physical quantity measurement device according to claim 10, wherein an outflow inlet distance, which is a separation distance in a direction orthogonal to the passage direction between the outflow side edge of the branch inlet and the passage line, is larger than an inflow inlet distance which is a separation distance in the direction orthogonal to the passage direction between the inflow side edge of the branch inlet and the passage line.

16. The physical quantity measurement device according to claim 10, wherein the inclined branch path extends straight along the branch coincident line such that the inflow inclined surface and the outflow inclined surface are parallel to each other.

* * * * *